(12) United States Patent
Rackham

(10) Patent No.: US 9,959,510 B2
(45) Date of Patent: May 1, 2018

(54) SYSTEM AND METHOD FOR ASSEMBLY OF BUSINESS SYSTEMS FROM REUSABLE BUSINESS CONTROL ELEMENTS IN AN ASSET BASED COMPONENT BUSINESS MODEL ARCHITECTURE

(75) Inventor: Guy Jonathan James Rackham, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 2078 days.

(21) Appl. No.: 12/325,284

(22) Filed: Dec. 1, 2008

(65) Prior Publication Data

US 2010/0138265 A1    Jun. 3, 2010

(51) Int. Cl.
G06Q 10/06    (2012.01)

(52) U.S. Cl.
CPC .......... *G06Q 10/06* (2013.01); *G06Q 10/0637* (2013.01); *Y02P 90/86* (2015.11)

(58) Field of Classification Search
CPC ............................. G06Q 10/10; G06Q 10/06
See application file for complete search history.

(56) References Cited

U.S. PATENT DOCUMENTS

| | | | |
|---|---|---|---|
| 6,601,233 B1 | 7/2003 | Underwood | |
| 7,162,427 B1 | 1/2007 | Myrick et al. | |
| 2002/0059079 A1 | 5/2002 | Negri | |
| 2005/0065955 A1* | 3/2005 | Babikov et al. | 707/101 |
| 2005/0246215 A1* | 11/2005 | Rackham | 705/7 |
| 2008/0162238 A1* | 7/2008 | Subbu et al. | 705/8 |
| 2008/0294408 A1* | 11/2008 | Padmanabhan | 703/13 |
| 2009/0037342 A1 | 2/2009 | Kennedy | |

OTHER PUBLICATIONS

Ernest, M.; Nisavic, J. M.; , "Adding value to the IT organization with the Component Business Model," IBM Systems Journal , vol. 46, No. 3, pp. 387-403, 2007.*

Ramadour, Philippe and Corine Cauvet. 2002. Approach and Model for Business Components Specification. In Proceedings of the 13th International Conference on Database and Expert Systems Applications (DEXA '02). Springer-Verlag, London, UK, UK, 628-637.*

* cited by examiner

*Primary Examiner* — Maria C Santos-Diaz
(74) *Attorney, Agent, or Firm* — Whitham, Curtis & Cook, PC

(57) ABSTRACT

A method and system for assembling business systems by identifying assets and commercialization mechanisms needed for a business system, which are then associated with business components described on a component business model (CBM) map, based on asset types and elemental control structures that are common across an industry, and therefore reusable. The generic elemental control structures needed for the business system are configured and then assembled into a service network for implementing the business system. A business system so assembled may be enhanced by adding elemental control structures to the service network.

20 Claims, 18 Drawing Sheets

SYSTEM AND METHOD FOR ASSEMBLY OF BUSINESS SYSTEMS FROM REUSABLE BUSINESS CONTROL ELEMENTS IN AN ASSET BASED COMPONENT BUSINESS MODEL ARCHITECTURE

RELATED APPLICATIONS

This invention is related to the following contemporaneously filed patent applications, the disclosures for each of which, including drawings, are hereby incorporated by reference: application Ser. No. 12/325,283 for "SYSTEM AND METHOD FOR ESTABLISHING A COMMERCIAL ECOSYSTEMS BLUEPRINT IN AN ASSET BASED COMPONENT BUSINESS MODEL ARCHITECTURE"; application Ser. No. 12/325,285 for "SYSTEM AND METHOD FOR STRUCTURED COLLABORATION USING REUSABLE BUSINESS COMPONENTS AND CONTROL STRUCTURES IN AN ASSET BASED COMPONENT BUSINESS MODEL ARCHITECTURE"; application Ser. No. 12/325,288 for "SYSTEM AND METHOD FOR DETERMINING A THRESHOLD OF DECOMPOSITION FOR ENABLING INCREMENTAL DEVELOPMENT OF PERSISTENT AND REUSABLE BUSINESS COMPONENTS AND CONTROL STRUCTURES IN AN ASSET BASED COMPONENT BUSINESS MODEL ARCHITECTURE".

BACKGROUND OF THE INVENTION

Field of the Invention

The present invention generally relates to business architecture, and in particular to systems and methods for organizing a business to adapt quickly to changing conditions.

Background Description

In describing the shortfalls in current approaches to business architecture an analogy to building architecture may be used. Buildings are tangible items with distinct physical properties whereas a commercial business is a more complicated entity, combining many tangible elements such as offices, factories and equipment with intangible elements such as product designs, market knowledge and customer goodwill. Even so much can be inferred about the nature of business architecture by comparing it to the well established 'art and science' of buildings.

The following table compares some aspects of building architecture with their business architecture equivalent:

TABLE 1

| Architecural Element | Building Architecture | Business Architecture |
|---|---|---|
| Vision | Artist's impression/vertical elevation | the Business Model |
| Requiremets | Building's purpose/use | Business strategy and plans |
| Rules | Planning regulations | Regulatory environment |
| Specifications & standards | Building material specifications | Technology, organization and procedural standards and guidelines |
| Blueprints | Many including: Site plan, building plan, plumbing diagram, wiring diagram, interior design specification | Many including: organization charts, office layout, operational procedures, systems/IT plans |
| Tooling | CAD/CAM drafting tools | Business design tools |

Some rows in the table include building architecture content that can be easily related to well established and equivalent approaches that would fit a corresponding business architecture. For example the building architect's "vision" maps to a commercial enterprise's business model, "requirements" define the supporting business strategy and plans. Similarly "rules" and "specifications" can be related to various commercial standards and guidelines that regulators, trade associations and markets in general might impose. The key row in the table to compare in more detail is the use of different types of "blueprints" or model representations.

The role of a model is both to simplify the representation and then highlight or accentuate some specific aspect of its subject. For example in building architecture a wiring diagram would typically include a very simple schematic of the room layout but would then add extensive detail relating to the specification and routing of the electric wiring and electronic components.

In order to fully define some entity represented by an architecture such as a building a wide range of different models are used. To determine what models might be needed one could list all the parties that would be involved in the 'art and science of designing and making a building' and then select model views that would help define their associated facet of the architecture. Easy to identify are the model views that might be needed by the builders, glaziers, plumbers, electricians, decorators, and furnishers.

Then there are the less obvious perspectives of the building owners and inhabitants—buildings and their architectures are more than the physical elements, they are built with a use in mind—a room might be intended as a dining room or a lecture hall, a building might be a police station or a shopping center. Model views of 'uses' are harder to visualize but, with respect to a building, designs specifying a type of room and/or simple descriptions usually suffice. This association between a room and its intended use is essential to complete the overall building architecture as the finer details of the construction will be defined by the intended uses made of different rooms.

As a wiring blueprint can overlay the routing of the wiring and positioning of electronic components within the rooms of a building design, an information technology (IT) overlay can be developed showing the information flows and processing within the business components of a business design. IT solution design is one aspect of business design in the same way that electrical wiring is one specialist aspect of building design. IT design for business is clearly more complex than its electrical wiring counterpart as it deals with information rather than the simple commodity of electric power.

The example of the architecture of a building and the role of a wiring blueprint within that architecture is used to highlight the important design decision that determines what aspects of the interactions between components (and internal component operation) are suited to an IT based solution and what best remains an aspect of person to person communications. The prior art approach to this design decision is to focus on the automation role of IT, and apply automation IT to the internal execution of a business building block, and also to the collaborative functions of certain building blocks (e.g. production in manufacturing) where the interactions with other building blocks are structured and sequential or involve structured data. With respect to building blocks in the business control domain, where message traffic is conversational and the nature of interactions with other building blocks is largely asynchronous, the prior art design choice leaves the solution of business control problems to person to person communication.

Business architecture needs to include model views to address considerations analogous to the different blueprints in a building architecture for electrical wiring, plumbing, heating and the like; however, this is where existing approaches fall short. Though there is no shortage of different model representations of commercial business there are major problems associated with combining these model views into an integrated design that compares to building architecture:

Few models for intangible ingredients—unlike building design where the constituent ingredients are mostly tangible items, a significant proportion of business design involves intangible ingredients such as reputation, knowledge, and customer relations for which effective and practical model representations are scarce.

Usage is often only informally linked to ingredients—the fairly simple association of usage with a room in building architecture is not so easily handled in commercial activity. Usage views or process models are probably the dominant type of model used in business design. But the definition of the links between the steps in a process and the underlying commercial assets/ingredients that are employed are not always formal nor are they comprehensive, particularly with respect to intangible assets.

Model inconsistency—in a building architecture most model views are easily related to the general room layout of the building and hence to each other. There is no equivalent 'layout' of commercial business to help align models to an integrated business architecture.

Furthermore, the inconsistency of models currently being applied to business architecture conceals a more fundamental problem. While businesses grow and change, it is disruptive to the business when changes demanded by the market place make too many of its architectural models obsolete. Business requires a certain level of stability in its models; business cannot operate efficiently in the market place if too large a portion of the systems developed from these models have to be replaced when the business adapts to changed market conditions.

Given these shortfalls in prior art approaches to business architecture it is not surprising that the 'big picture' view and easy navigation between various specialist perspectives supported in the conventional architecture of physical buildings is not readily available to the architecture of a business. As a result, business design often ends up as a disparate collection of models, each attuned to a specific feature but without any assurance that a change in market conditions will not make many of them obsolete and without a coordinating framework to bring them together into an integrated whole that has reasonable prospects for enough stability over time that the business can concentrate its resources on serving the market place profitably, without draining resources into renewing computer supported business models that have become obsolete.

Developing approaches to business designs that yield computer support structures that are more resilient in response to changes in market conditions and more adaptable to changes in the structure of the commercial ecosystem continues to be an elusive goal. There is a need for improved methodologies in this area.

SUMMARY OF THE INVENTION

An aspect of the invention is a method for assembling business systems from re-usable business control elements. The method operates by identifying assets needed for a business solution, along with the commercialization mechanisms needed to leverage the assets to provide the solution. Then the identified assets and commercialization mechanisms are associated with asset types and corresponding elemental control structures described on a component business model (CBM) map of elemental design elements. Typically, the CBM map is an industry map, having business components that are generic to an industry. But many business components are also generic across industries and therefore a universal CBM map may be used. The associated elemental control structures are then configured to leverage the respective corresponding asset types to provide the business solution. The elemental design elements or business components comprised of the selected and configured control structures are then assembled into a service network that embodies the business system for providing the business solution.

Another aspect of the invention is the alignment of information systems support with individual elemental control structures and their corresponding business components. At the generic level of these control structures found in an industry or universal CBM map, computer support systems aligned with these control structures can be made configurable and reusable. By this alignment, where the granularity of the computer support system is parallel to the granularity of the elemental control structure, it becomes feasible to flexibly assemble business system that are appropriately supported by information technology at the outset, simply by configuration at the time of assembly. A further efficiency derives from the technique of linking templates for this granular computer systems support with their associated elemental control structures in the generic CBM map. These flexible computer support structures displace prior process approaches which treat the business system as a unit rather than as a collaborative service network of business components.

In another aspect of the invention, a business system assembled from reusable components may be enhanced by the addition to the service network of related control structures and their associated business components. A further aspect of the invention is the assembly of another business system, where some of the elemental design elements may be reused from a prior business system, with the remaining business components being adapted from a generic CBM map. All the components are then configured and assembled into another service network.

Yet another aspect of the invention is the provision of automated computer systems support for the operation of the invention itself, by providing a display of the generic CBM map and associated capabilities for enabling configuration and assembly of selected business components. The display conventions provided by the CBM map and its overlays provide a convenient interface for facilitating an interactive approach to an "on-demand" assembly of business systems suitably responsive to changes in the market place or competitive environment.

A further aspect of the invention relates to the incremental migration of a business from a process oriented business architecture to an architecture of reusable business components. This migration can proceed step by step, as individual business systems are assembled in accordance with the present invention. An important aspect of this migration is the development of information systems support structures aligned in granular fashion with their corresponding business control structures at the business component level. In this manner the legacy process oriented computer support systems will slowly atrophy.

The nature of the present invention is to use elemental business control structures, as defined hereafter, to model and align solutions to more flexible patterns of behavior. This allows the business designer to define the context and participants in business activity, as opposed to defining a prescribed sequence of steps in a process that might be automated.

The present invention uses a business design technique that isolates business components that both map to the building blocks of an asynchronous, collaborative operating model as well as establishing a unifying concept that can provide the foundation for business architecture. But there is a further implication of this design approach that has far reaching implications for the nature of solutions that are developed conforming to these designs with respect to operational re-use.

The design technique employed by the present invention is asset based rather than process based. It derives commercialization mechanisms and associated control structures needed to exploit/leverage different types of commercial assets. For the specification of the control mechanisms it distinguishes between the purpose or role which is relatively constant over time and its particular implementation that does evolve as new practices are discovered or invented.

Asset types are not specific to any one industry. Items such as staff, buildings, equipment, knowledge, customer relationships occur in many if not all industries. Similarly, the commercialization mechanisms associated with the use of an asset type are themselves fairly generic. For example, for asset type 'customer relationship' and the associated commercialization mechanism 'account for payments/receipts' is a general requirement.

Industry specific requirements (and other reasons for specialization such as geopolitical, scale or sophistication) are related to specific features of the implementation of the commercialization mechanism rather than its purpose or role. Business designs are typically preceded by an analysis that decomposes the business, beginning with the highest conceptual level that defines the purpose of the enterprise and continuing down to a detailed implementation level.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The inventor of the present invention also invented the co-pending invention described in U.S. patent application Ser. No. 11/176,371 for "SYSTEM AND METHOD FOR ALIGNMENT OF AN ENTERPRISE TO A COMPONENT BUSINESS MODEL" (hereinafter termed "the above referenced foundation patent application"), whose disclosure is hereby incorporated by reference as foundational for the present invention in content and terminology.

The present invention uses a business design methodology that stipulates that commercial business activity can be modeled by first identifying a general collection of asset types, some combination of which is brought together to form an enterprise. The combination of asset types 'owned' or somehow made available to a business are each then manipulated in one or more generic ways in the execution of business, using structures referred to as 'commercialization mechanisms', that is, mechanisms through which an asset is made commercially useful to the enterprise in terms that can be measured financially. Examples of general asset types are employees, production capacity, buildings and facilities, intellectual property. Corresponding examples of commercialization mechanisms are: for employees (contract, assignment, payroll, certification/qualification), for production capacity (production schedules, production configuration), for buildings and facilities (office allocation, facilities allocation schedules, operating schedules, maintenance schedules), for intellectual property (patents, licenses, assignments, deployments). Under this business design methodology computer systems are used to implement instances of one or more of these commercialization mechanisms.

Figure 1A:
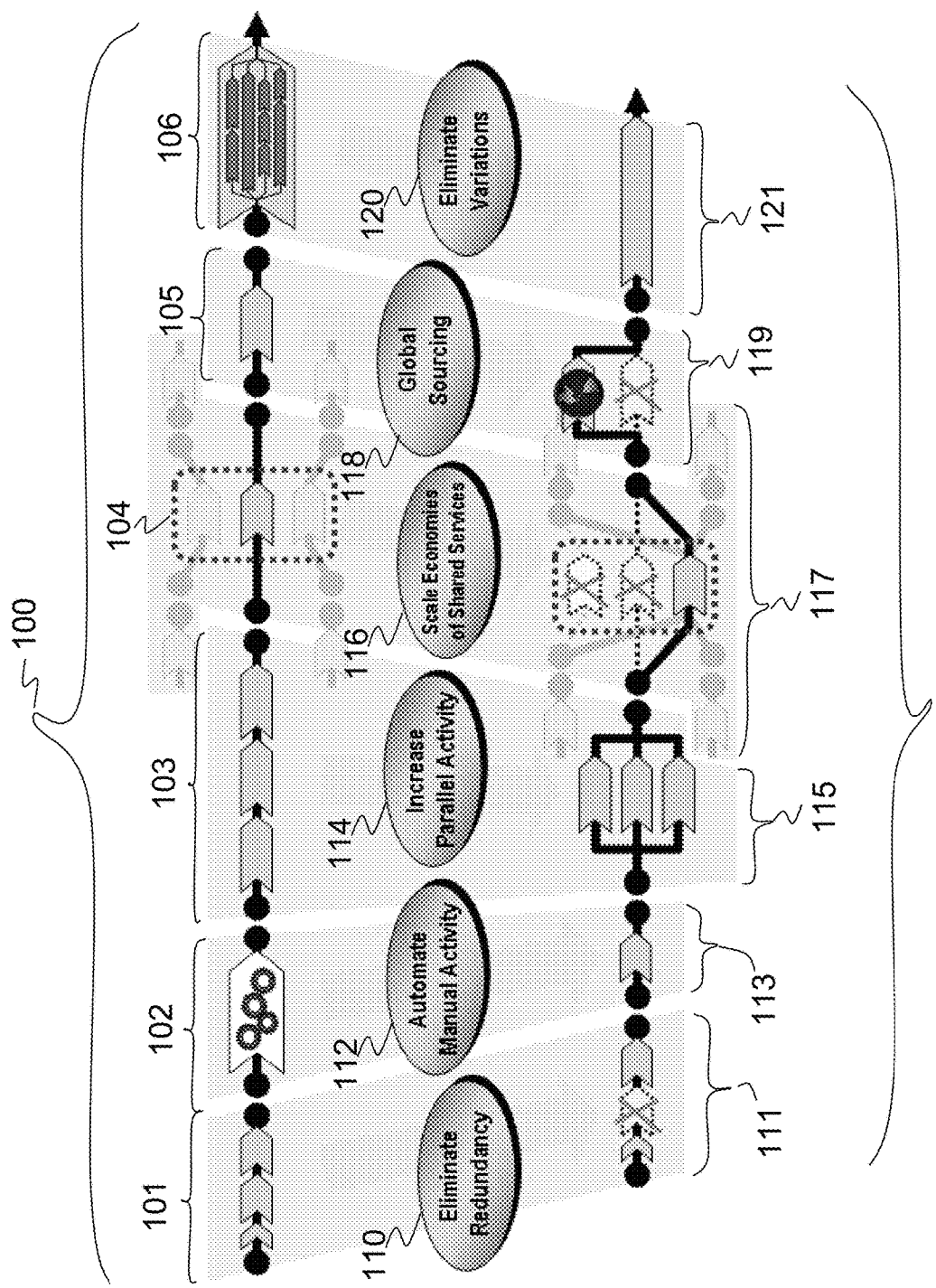
FIG. 1A is a schematic representation showing traditional techniques for improving a business process.

Conventional business design is dominated by process analysis. That is, the focus of analysis is a sequence of activities performed by the business to achieve an outcome of net value. As shown in FIG. 1A traditional process improvement for a business process 100 focuses on six general techniques. First, the process 100 is analyzed to identify 101 and eliminate redundancy 110, as represented by 111. Second, manual activity (represented by 102) is automated 112, as represented by 113. Third, where possible, activities that had been performed in sequence (represented by 103) are performed in parallel 114, as represented by 115. Fourth, scale economies are invoked to combine separately performed services 104 under a common service that is shared 116, as represented by 117. Fifth, sourcing (represented by 105) is expanded to include global sources 118, as represented by 119. Sixth, an effort is made to standardize multiple ways of doing a process (represented by 106) by eliminating variations 120, as represented by 121.

Figure 1B:
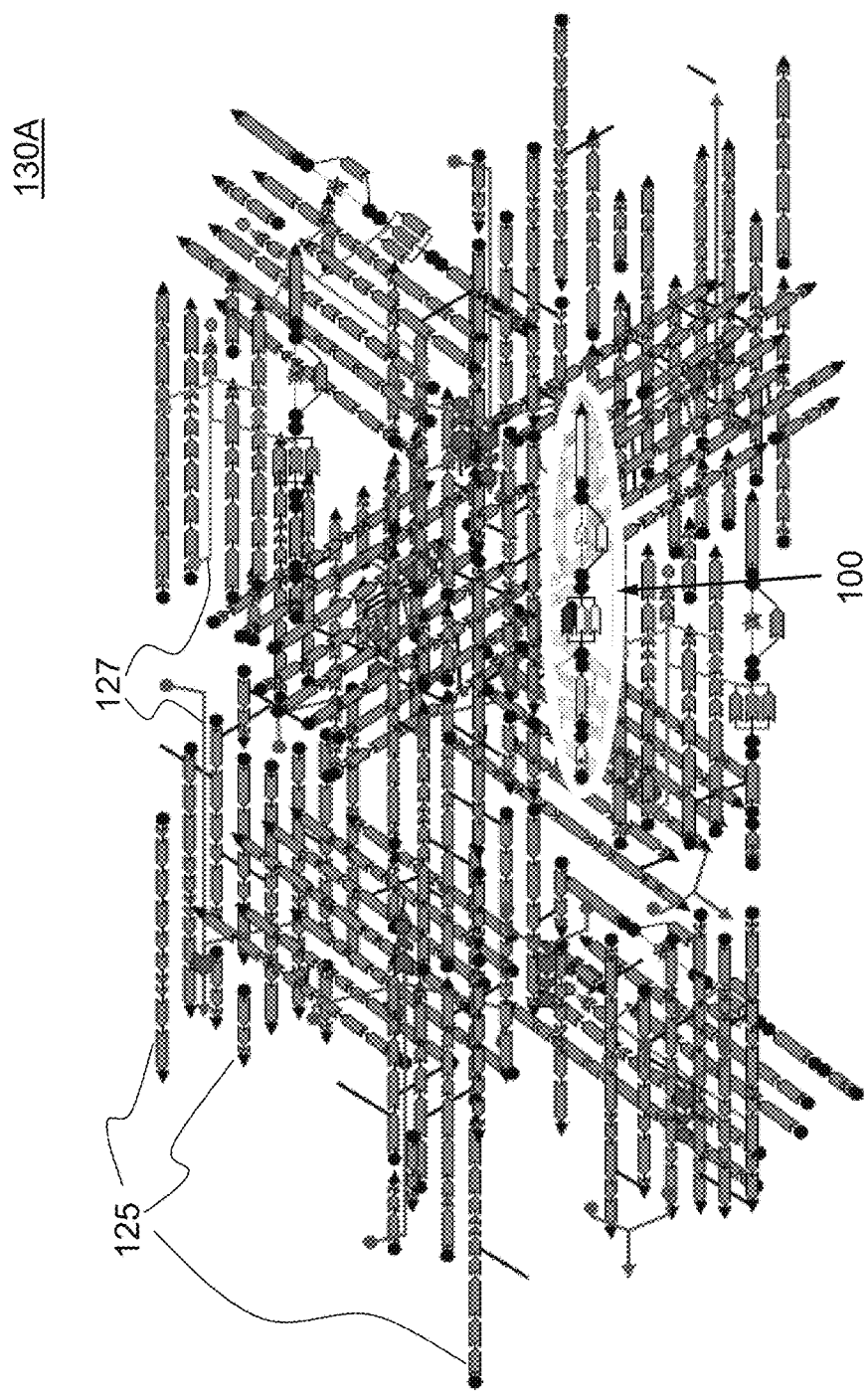
FIG. 1B is a schematic representation of a plurality of processes supporting a business.
Figure 1C:
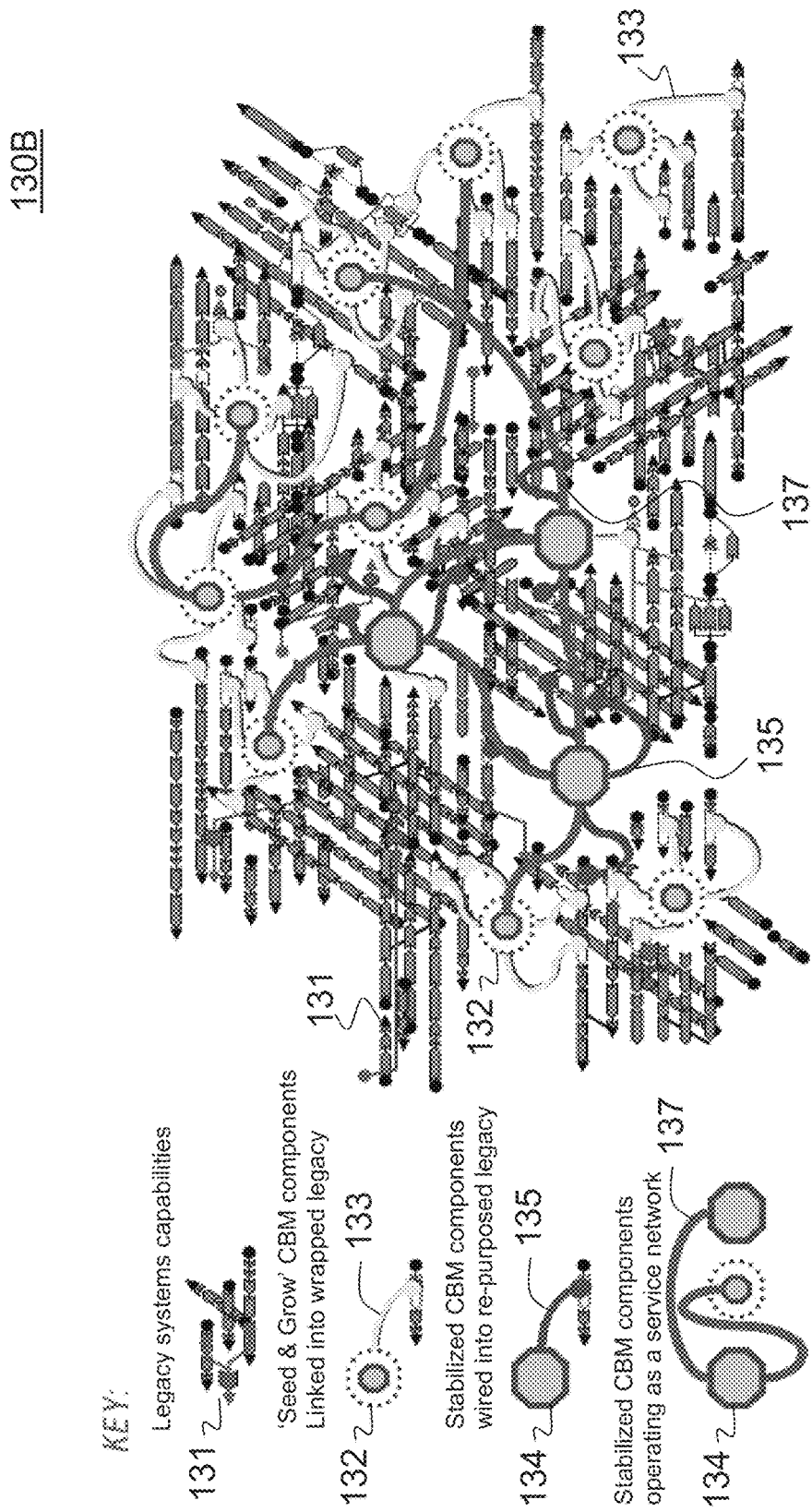
FIGS. 1C and 1D are schematic representations of an early and late stage, respectively, in the incremental displacement of a business process based architecture with an architecture of stabilized CBM components operating as a service network.
Figure 1D:
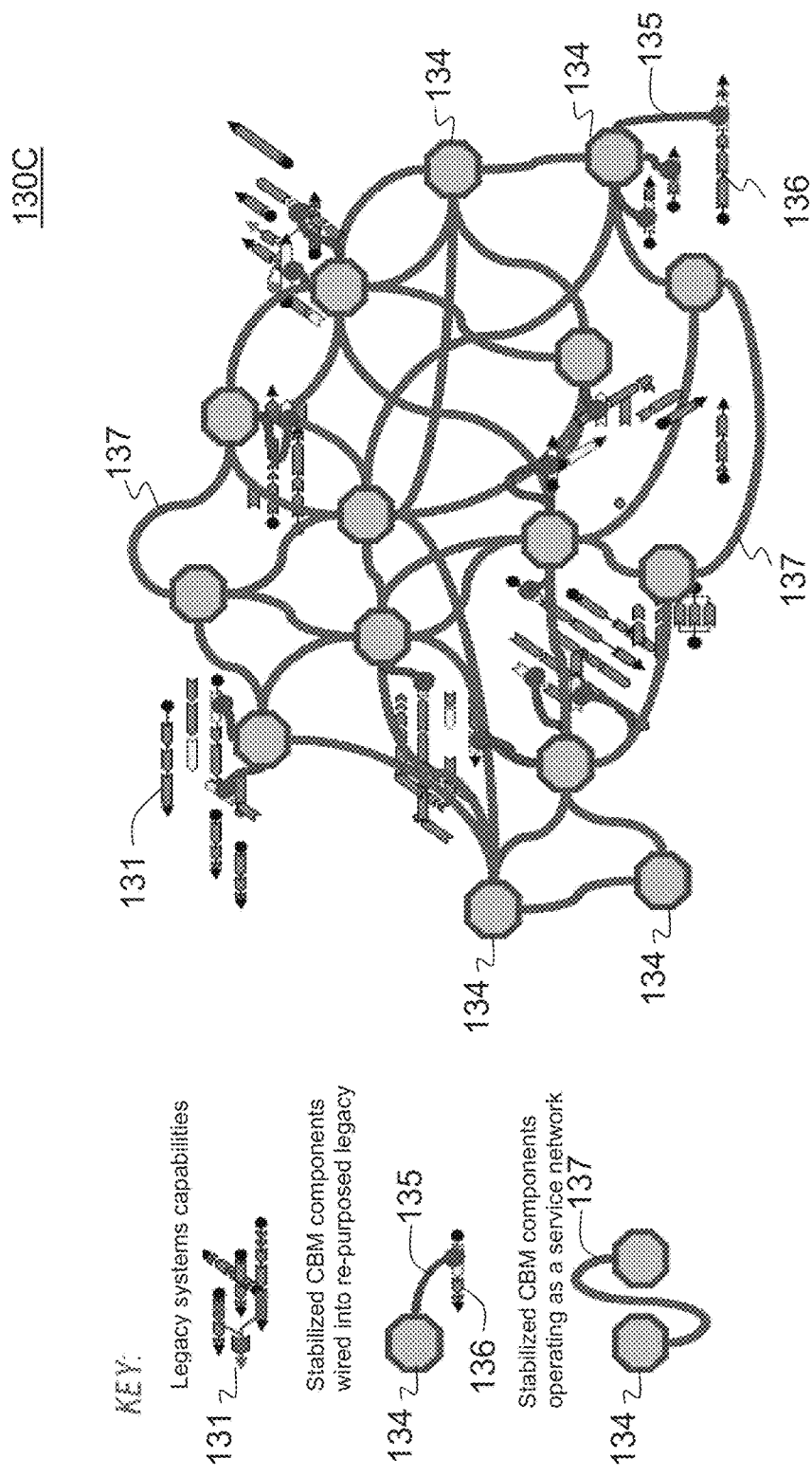

As those skilled in the art will appreciate, a business process is in fact performed with the resources available to the enterprise. These processes are often modeled by computers, and supported by computer implemented systems having various interfaces with the other resources used to perform the various processes through which the business operates. The process 100, described in FIG. 1A, is therefore a more general representation of a business process that may be modeled and supported by a computer implemented system. Process 100 is shown in FIG. 1B in context with other processes (e.g. processes 125), which may interconnections (e.g. as represented by 127). A typical large business may have several hundred significant business processes that represent behaviors that traverse different aspects of the organization in a complex matrix of overlapping and interacting processes, as represented by 130A. The design technique upon which the invention relies allows these processes 125 and their interconnections 127 to be gradually replaced with substantially fewer asset based component structures, as will now be shown with reference to FIGS. 1C and 1D.

It is to be noted (as is more fully explained in the above referenced foundation patent application) that asset based components are logical structures and do not necessarily correspond to physical organizational structures of the enterprise. And, as with processes (e.g. 100, 125), the work performed by these components is, in fact, performed by the resources of the enterprise. However, components in this implementation are non-overlapping aggregations of activities defined with reference to assets of the enterprise, the work being represented as services. Each component may be both a user and a provider of services.

Initially, these asset based component structures 132 are linked 133 into wrapped legacy processes 131. As these component "seeds" 132 grow within matrix 130B of business processes they become stabilized components 134, that is, they more fully implement the supporting structures (as hereinafter described) characteristic of the design techniques upon which the present invention is based. Corresponding to this growth phase, related legacy processes are re-purposed to more explicitly account for the component. Thus the connection 135 between the stabilized component 134 and the re-purposed legacy process 136 is more formally integrated into the operation of the business. As this growth continues, more stabilized components 134 are developed, operating together as a service network (represented by links 137). Eventually, this service network of asset based components substantially displaces the matrix of business process structures, as shown in the progression from 130B to 130C. In this scenario, remaining legacy processes 131 continue operation until displaced by the service network of stabilized CBM components.

The design concept employed by the present invention is asset based rather than process based, as indicated above, and has features and aspects that result in solutions that are both highly re-useable (i.e. the same solution can be deployed in different commercial organizations with minimal rework) and that can be adopted incrementally (i.e. the specific capability can work alongside existing facilities and added to over time as might best benefit the commercial business).

Figure 2A:
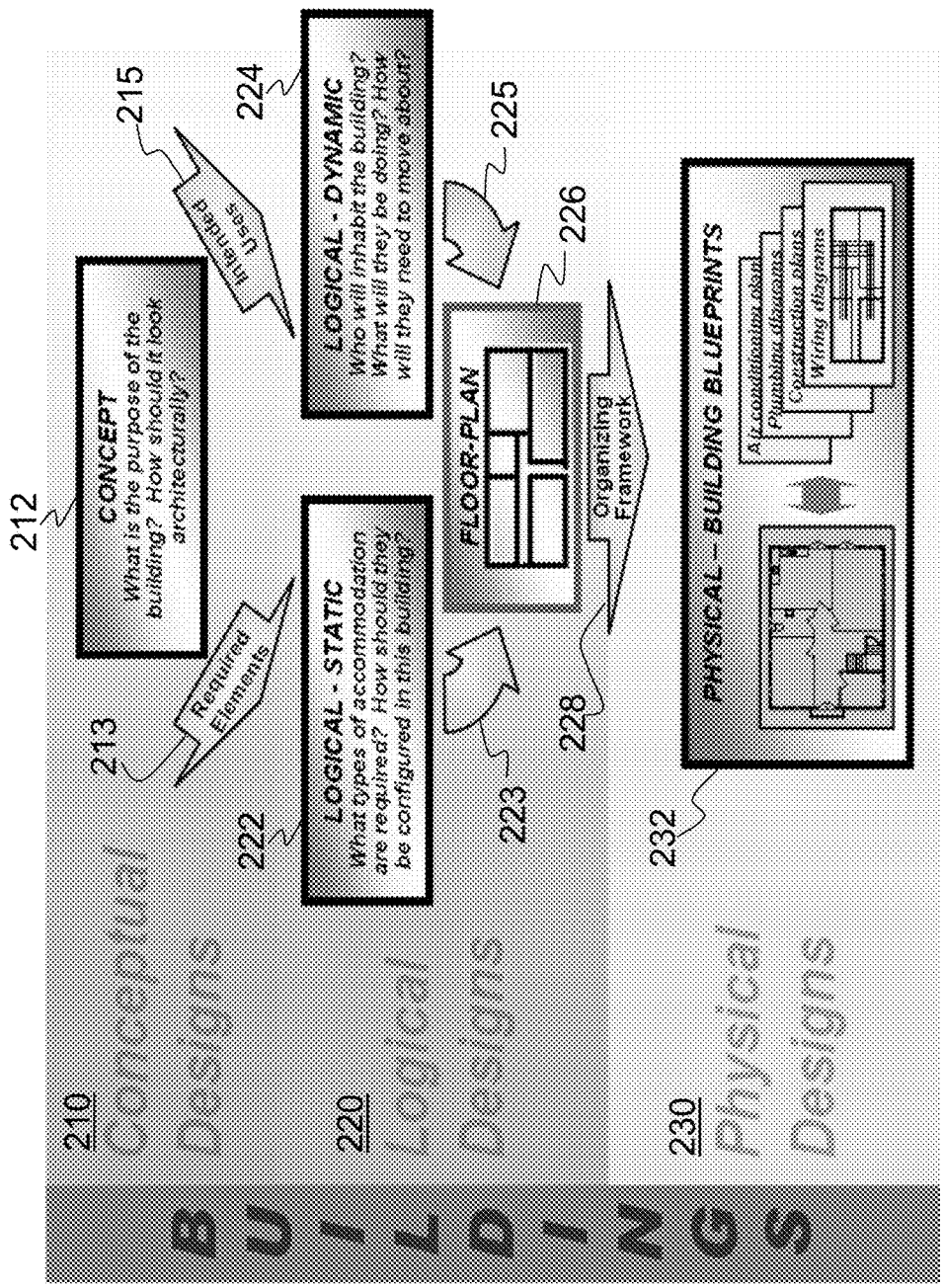
FIGS. 2A, 2B and 2C are schematic representations, respectively, of a building architecture, an asset based business architecture, and a process based business architecture.

The design concept derives in part from properties observed in mature architectural approaches such as building design as are then interpreted in the less mature field of business architecture. "Architecture" in the generic sense may be defined as the art and science of designing and building a solution. One implementation of this generic view of architecture recognizes three layers of design with some key properties to the design representation at each layer, as will now be described with reference to FIGS. 2A, 2B and 2C.

At a conceptual level, a design defines the external perspective of the entity, stating its purpose and high level properties, without going into any detail of how it might be realized in practice. For building architecture 210 this would be the purpose of the building such as a school, and then any associated properties that might help specify its need/justification/role. How should the building look from an architectural point of view? For Business Architecture (BA) the equivalent 240 is the mission or purpose and market strategy of the organization. How does the business intend to compete?

At a logical level (e.g. 220, 250), a design defines the structure of the entity by combining two perspectives into a consolidated view. The first perspective defines the 'static' aspects of the entity, in other terms the ingredients or persistent elements that collectively make up the entity. The second perspective defines the 'dynamic' aspects of the entity, in other terms the behaviors that the entity wishes to undertake and/or support. By combining sufficient detail of static and dynamic perspectives, a consolidated logical view of the entity can be developed, that selects and configures sufficient ingredients in combinations/layout as needed to enable the desired behaviors for the entity. This consolidated logical view defines an organizing 'blueprint' for the lower level physical design.

For building architecture, the static logical designs 222 refer to concepts such as types of accommodation (a kitchen, a dining room, a meeting room) for which, in terms of static design properties, there may be standard features and/or best practices and guidelines for their specification. These static designs 222 make use of ingredients or elements 213 which are appropriate for the building purposes 212. These static designs 222 are responsive to questions (and corresponding answers or determinations) about the types of accommodations that are required and how they should be configured in this building. The dynamic designs 224 for building architecture relate to intended uses 215 of the building, e.g. entertaining, group discussion, isolated working. These dynamic designs 224 are responsive to questions and corresponding determinations about who will inhabit the building, what they will be doing, and how they will need to move about.

For business architecture the static 252 and dynamic 254 perspectives relate well to the concepts exposed using the design principles upon which the present invention is based. Required elements 243 for a static design 252 would be a combination of an asset type and an associated control mechanism. These elements within the component business model imply a capability or use which is relatively persistent, and therefore the corresponding designs 252 are relatively static. For example, the asset type "employee" in combination with the "assignment" control mechanism implies a specific capability or use, namely, staff being assigned. Assigning employees to tasks is a capability that has been used in the past and will continue to be needed in the future. Thus the capability is persistent and the logical designs 252 that invoke this capability are relatively stable and, therefore, static.

On the other hand, while the capability is persistent and static, an instance of this capability may be invoked in a dynamic pattern, such as staffing up a new project. Furthermore, the precise mechanisms employed to invoke this capability may well evolve as decision making processes become more sophisticated. Moreover—and of particular significance to operation of the present invention—the stability provided by these asset based capabilities enable significant efficiencies in responding to the needs of the business to adapt in a competitive environment.

Figure 2B:
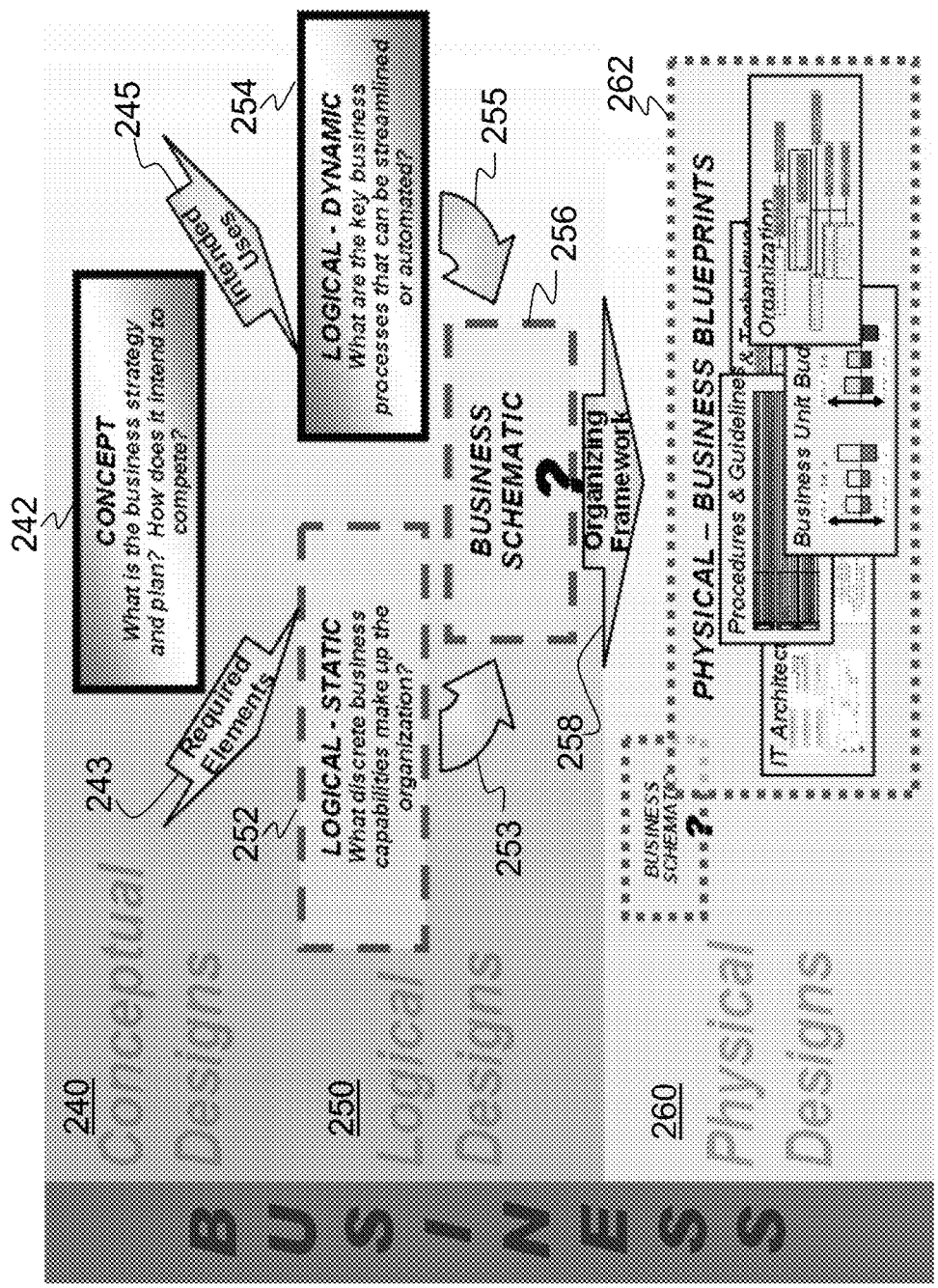

These adaptations in a competitive environment remain driven by the business purpose 242. As shown in FIG. 2B, intended behaviors 245 of the assets 243 are implemented through dynamic designs 254 which define operational behavior using models (e.g. process and collaborative models). A business architected in alignment with the Component Business Model (CBM) together with the enhanced CBM structures of the present invention will still need the functionality provided under prior art process oriented architectures. However, this functionality is more simply and more stably provided because of reliance upon persistent asset based component structures coupled with appropriate mechanisms for the commercialization of those assets. The dynamic designs 254 are responsive to questions (and corresponding answers or determinations) about what are the key business processes that can be streamlined or automated. These questions will also be asked in prior art process oriented business architectures, but the development of responsive answers under the prior art will not be able to rely upon the relatively stable logical designs 252 of the present invention, as further described in connection with FIG. 2C.

Thus an important aspect of the design approach upon which the present invention is based is that the intended behaviors 245 are enabled by commercialization mechanisms addressed to the assets 243 which are the ingredients required for the static designs 252. These mechanisms are the means by which the assets 243 required by the business purpose 242 provide commercial value to the enterprise. The output from dynamic logical designs 254 is selection and configuration 255 of static elements 253 (i.e. assets coupled with commercialization mechanisms) needed to support the identified dynamic behavior. Consequently, the logical designs 250 are at the intersection of static and dynamic behavioral analysis.

This results in a business schematic 256 that provides a coherent and specific structure, analogous to the floor plan of a building, around which particular "blueprints" for operating the business may be integrated. An important advantage provided by the invention is that the streamlining or automation of key business processes is more efficiently accomplished by selection and configuration 255 (using dynamic design 254) of relatively persistent contents 253 of the assets and commercialization mechanisms enabled by static design 252.

At the level of physical design (e.g. 230, 260) the implementation of architecture defines various aspects of the logical design. In building architecture these implementations 232 might be the primary structure, the décor, the wiring and plumbing. The floor-plan 226 serves as a consolidating organizing framework 228 for integration of the configuration decisions 225 provided by the dynamic design 224 with content 223 made available through static design 222. The logical design 220 plays a critical role in physical design 230 by defining a representation of the entity that is shared by all implementing physical designs 232. The floor-plan function 226 is operable because as an organizing framework it supports and structures an integration of the content 223 from the static designs 222 with the configuration 225 requirements driven by the dynamic designs 224. The physical designs 232 possess the item design properties determined by the static designs 222, and the building blueprints 232 conform to the design outline determined by the dynamic designs 224. The logical design 220 coordinated through a common floor-plan 226 ensures that the different physical representations refer to a consistent subject and can be implemented in a manner by which they all integrate. This approach maintains referential integrity between the different representations of a single coherent entity. That is, all building blueprints 232 consistently reference the same subject of the design from their different perspectives.

In building architecture the consolidating organizing framework 228 is provided by the floor plan 226, and as long as the different physical designs relate consistently to this consolidated logical blueprint, a coherent physical realization of the entity can be assembled. That is, for example, the wiring and plumbing will line up to the walls and décor of the intended room layout.

In business architecture the equivalent logical organizing framework is provided by the business schematic 256, which is the layout resulting from the arrangement and configuration of the asset types and their commercialization mechanisms. The combination of an asset type and a commercialization mechanism in the business architecture envisioned by the invention, as identified by static logical design 252, is analogous to a "room type" or an "accommodation type" in building architecture. The number and configuration of these ingredient "types" required for a particular business environment is determined as necessary to support the dynamic behaviors identified in the dynamic logical design 254.

It is important to recognize the consequence of this business architecture upon the CBM structure described in the above referenced foundation patent application. As a building might need three bedrooms, a business might need multiple realizations of a particular component. These multiple realizations may be viewed as three dimensions of "cardinality" of a business component. First, a component might repeat between lines of business within the enterprise. Second, a component might repeat between different geo-political environments within which the enterprise operates. Third, a component might vary when realized in different physical environments. For example, a customer interaction component may be implemented as a call center in one physical environment but as a web-site in another physical environment. Further, the customer interaction component may be supported for different products of the business and may be run in different regions of the world.

Thus the layout represented by business schematic 256 is an integration of the content 253 structured by the static designs 252 with configuration requirements 255 driven by the dynamic designs 254. In the design approach which is the premise of the present invention, the foundation for this layout is the component business map of the enterprise. Each component within this map represents a non-overlapping cluster of activities, each cluster corresponding to a logical and not necessarily physical view of the enterprise, so that the components on the map are mutually exclusive and collectively exhaustive in their coverage of the enterprise. Thus the component provides a distinct locus for the realization of one specific commercialization mechanism applied to one specific asset type. It is this combination of an asset type and a commercialization mechanism within a component that is the logical "atom" of content 253 that is configured 255 into business schematic 256. Thus the components may be viewed as being structured around asset types and the services provided by the component may be understood as being dependent upon the commercialization mechanisms. Furthermore—as an extension of the distinction between the logical character of components and the physical structures of the enterprise—a component may have multiple instances within the physical structures of the enterprise, of the kinds described above, responsive via configuration requirements 255 to an analysis of the desired dynamic behaviors determined in dynamic design 254.

However, it should be emphasized that business schematic 256 represents a well defined mapping to physical structures of the enterprise. The component business map itself represents a distillation of the activities of the enterprise to form a logical mapping from the enterprise. As described in the above referenced foundation patent application, this logical mapping may identify needed changes in the activities of the business (and, consequently, in terms of the present invention, changes in assets and commercialization mechanisms) in order to align the enterprise with the component business model of the enterprise. A significant value of the analysis that distills the activities of the enterprise into a component business map is that it provides a view of the enterprise—a mapping, if you will—that clarifies differences between where the enterprise is targeted to be and where it is, actually, in relation to the targeted service oriented structures.

The premise of the present invention is a further transformation, in the reverse direction, from the component business map back to the physical structures of the enterprise. The physical designs 262 possess the unit design properties 253 determined by the static designs 252. The physical designs 262—"business blueprints"—also embody the configuration decisions 255 determined by the dynamic designs 254. In this way the physical designs 262 reverse the distillation represented by the component business map itself, because these "business blueprints" translate directly into a fully configured and structurally complete enterprise, an enterprise architecture that conforms to business schematic 256. Thus the reverse transformation, in accordance with the conceptual designs 240, logical designs 250 and physical designs 260 which are foundational for the present invention, results in a set of business blueprints 262 that are coordinated through a common business schematic 256. In other words, the business schematic 256 serves as an organizing framework 258 for the business blueprints that map to the physical structures (i.e. assets commercialization mechanisms) through which the activities of the enterprise are conducted. It is the configured business schematic 256 that is analogous to the "floor plan" in a building architecture and through which different implementations or physical designs 262 of the entity—such as its organization charts, its financial plans, and its resource allocations—are coordinated.

Figure 2C:
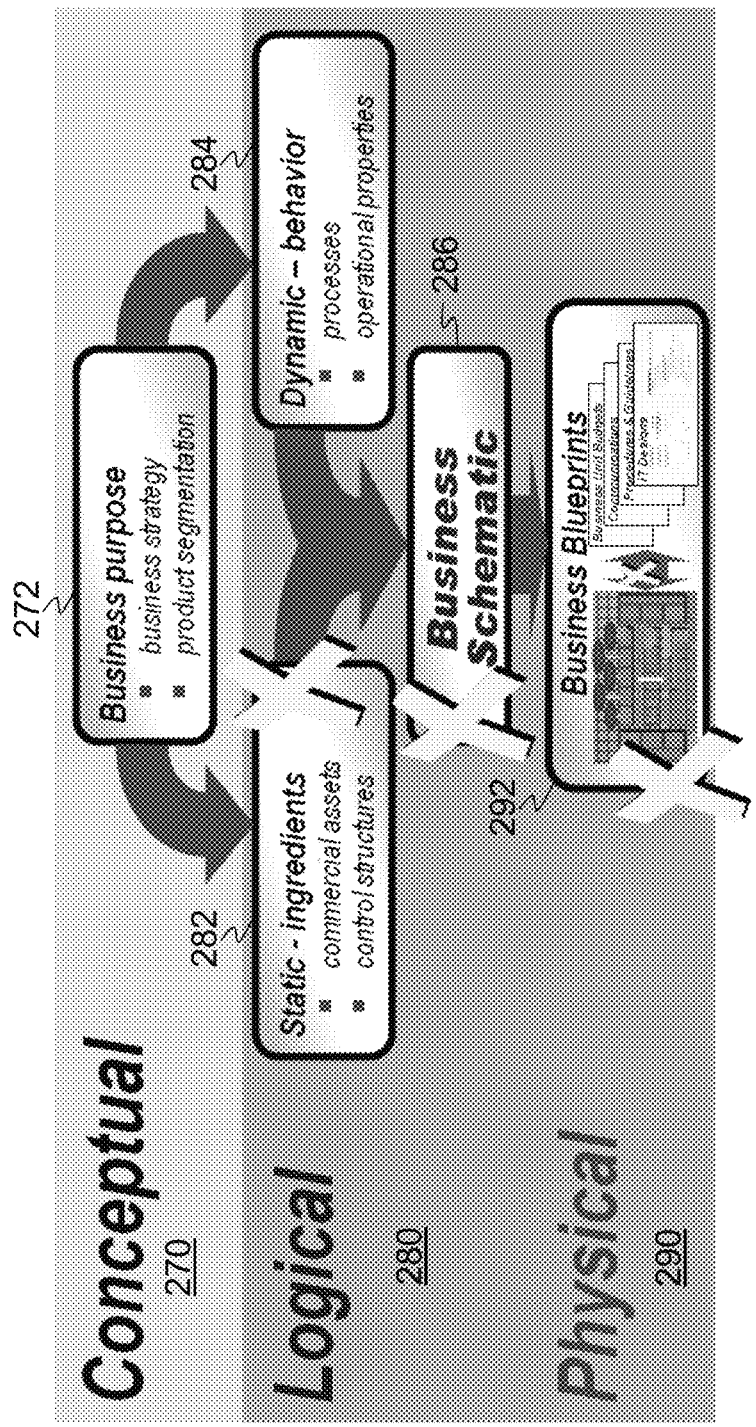

As will now be noted with reference to FIG. 2C, a process oriented design approach does not provide the overall coherence of a 'blueprint'. At the conceptual design level 270 a process design approach reflects the same business purpose 272. However, at the logical design level 280 there is no place in the design of business processes for a static view 282 of commercial assets and their corresponding control structures. The design of business processes is heavily focused on dynamic behavior 284. These "dynamic" views of key behaviors are not mapped to any representation if the "static" business ingredients. To use an analogy to building architecture, it is like describing how the residents might want to prepare and eat a meal without being able to describe the role of the kitchen and dining room in that behavior. The process approach enables optimization of the recipe and approach to preparing the meal, but does not accommodate in a coherent and integrated way the context within which the meals are prepared.

In the same way a business process approach articulates the dynamic aspect of business behavior but is unable to fully define the context within which the behavior is executed, or more precisely define the capabilities that are involved in its execution. As a consequence there is no business schematic 286 having the relative stability provided by static ingredients 282, and without the business schematic 286 there is no basis for coordinating subordinate business blueprints 292 at the physical level 290.

Figures 3, 3A:
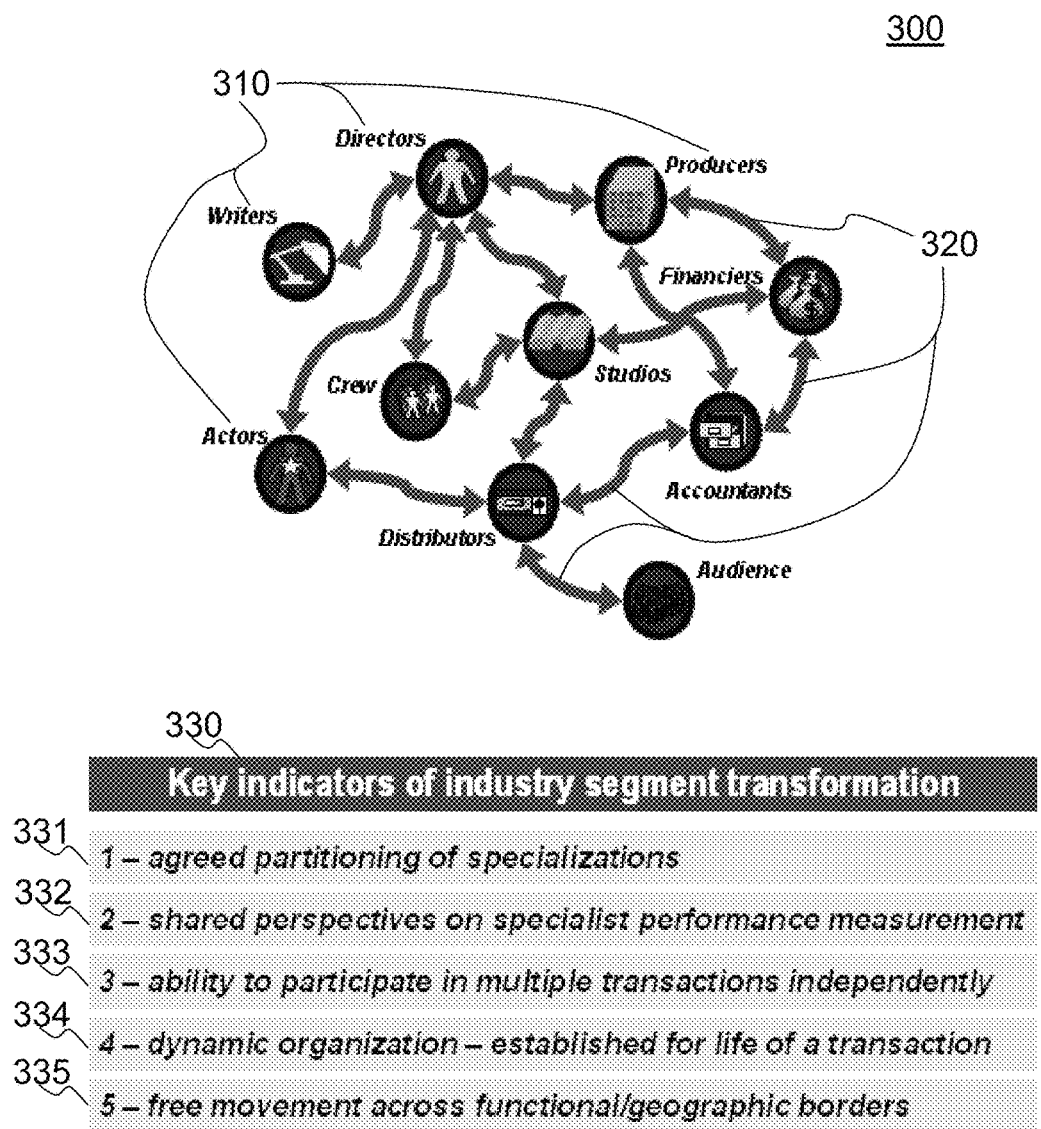
FIG. 3 is a schematic representation of a collaborative network in the film industry.
FIG. 3A is a table of indicia for transformation to a collaborative network.

Turning now to FIG. 3 there is shown a prior art example of organizing principles that are able to be extended into more complex business environments by the design approach which is the basis for the present invention. The collaborative network 300 shown in FIG. 3A for the film industry shows in schematic form the various assets 310 (e.g. actors, writers, directors, producers) needed to produce a film, together with their collaborations 320 that are the constituent elements of the network.

As a people and project intensive industry, the business 'building blocks' of the film industry have been established in practice. Over time, the skill and capability specializations observed in the film industry have come to be accepted. Not only are they the subject of general agreement 331 across the industry, but there have developed expectations of performance of the various specialists that are the subject of shared perspectives and standards of measurement 332. Several further attributes of film industry collaboration should be noted because of their particular relevance to the business design approach which undergirds the present invention. It will be observed that the various specialists in the film industry are able to participate in multiple transactions independently 333. The organization of specialists in a particular film project is established for the life of the project 334, and in that sense the organizational principle of the industry is dynamic. For example, particular directors, actors, producers, studios and financiers may be involved together in one film project and with other corresponding functional specialists on other projects, sometimes at the same time. Particular identified assets may serve on a particular film project in multiple specialist roles, for example, as both actor and director or as both producer and financier. This movement of assets across functional borders 335 also applies to geographic borders, which is of particular interest in the global marketplace within which modern business enterprises operate.

Thus the film industry exemplifies certain key indicators 330 of industry segment transformation. The example presented by the film industry is not readily extended to more complex and larger scale business organizations, for reasons which are evident. The scale of a particular film project and the control structures necessary for effective collaboration of the partitioned specialties is small enough to be managed by personal chemistry and discussions carried on in person or by the now ubiquitous telephone and electronic mail, not requiring complex information systems support. To be workable and replicable across a wide range of far more complex business activities, the collaborative model of the film industry requires a series of novel extensions, including those of the present invention.

Yet the simplified film industry model is instructive for its coherence and stability, a coherence and stability often lacking in prior art approaches to business architecture, but present in the business design approach which forms the context of the present invention. The defined role of a participant in the film industry is similar in concept to a commercialization mechanism applied to a specific asset type. The dynamic collaboration that is apparent in the way the participants in the film industry work together is similar to the collaborations between components defined in a CBM map. The components implement the different commercialization mechanisms that manage the commercial assets of the enterprise, and the collaboration between components sets up a dynamic commercial equilibrium comparable to the observed stabilization of participant roles in the film industry. Whereas the coherence and stability of the film industry example have evolved over time, the coherence and stability provided by the business design approach forming the context of the present invention follows from the effort put into the distillation of an enterprise into non-overlapping asset based components. It turns out that the resulting CBM design structure for logical organization of the enterprise contains components that are reusable within and even across industries. Consequently, alignment of a commercial business and its supporting systems with a CBM model enables the aligned business to use solution approaches that have been developed in other businesses similarly aligned. A physical realization of a logical component might be easily integrated into many different organizations, facilitated by the fact that the role/boundary of the component is consistently interpreted across the different organizations.

Prior art approaches have understandably been developed to deal with business organizations as these organizations have structured themselves through practice. But whereas practice considerations led to asset based collaborative forms in the film industry, more complex commercial activities evolved in a different direction, focusing on core manufacturing facilities and the economies that come from volume production. Business control systems have, in consequence of this focus, followed a similar model. Transition to a different focus, embodied in the business design approach upon which the present invention is based, may therefore be viewed as a difference in emphasis, as will now be explained with reference to FIG. 3B. Business control 340 and production 342 are domains with different operating properties. The traditional manufacturing pipeline is most easily supported by process models 338, which have grown and dominated as described in connection with FIGS. 1A and 1B. The result has been business controls implemented as process structures.

The premise of the present invention is a reverse emphasis. The first step in reversing the emphasis is to align the business to a component business model (CBM) of the enterprise, as described in the above referenced foundation patent application. In a map 330 of components for an enterprise aligned in this manner, components are grouped under non-overlapping business competencies 332 (e.g. business and resource administration, new business development, customer management, etc.) and arranged by management level 334, that is, direct components (i.e. components that serve to define policy, plans, goals, organization and budgets, and assess overall performance of the business), control components (i.e. components involved with allocating tasks and resources, authorizing execution, applying policy, interpreting goals, and overseeing and troubleshooting performance), and execute components (i.e. components for administering, maintaining and operating the business).

Figure 3B:
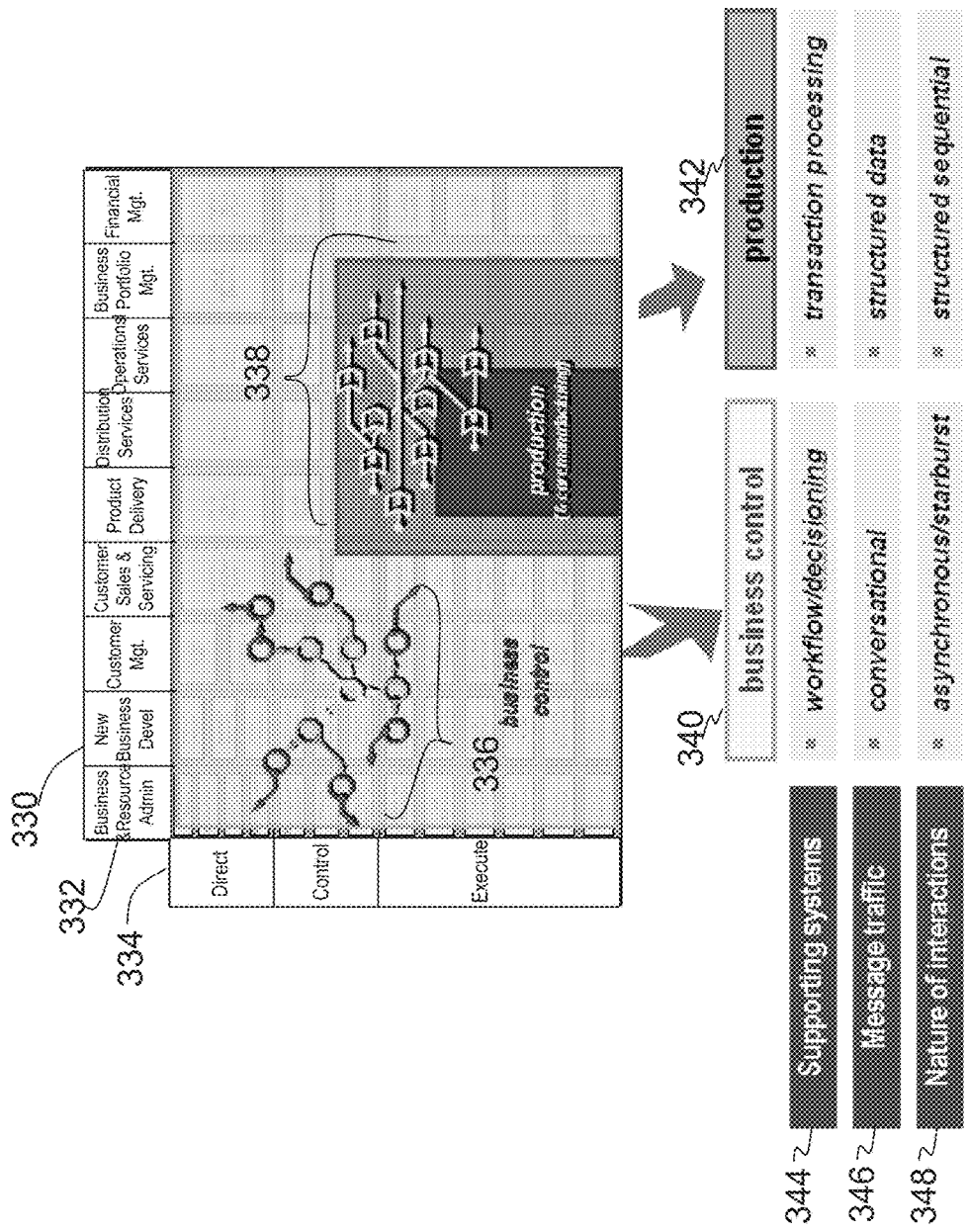
FIG. 3B is a schematic representation of different operating properties of the two domains of business control and production.

In a CBM alignment, the components may be viewed as interacting via a service collaboration network 336. It should be noted that the CBM alignment may proceed incrementally, as described in connection with FIGS. 1C and 1D, using the additional novel structures and principles provided by the design approach upon which the present invention is based. The need for transition in the business control arena from a production focus, where process analysis 338 dominates, to a CBM alignment where collaborative service networks 336 dominate, may be understood by noting the different operating properties, as shown in FIG. 3B. With respect to supporting systems 344, business control 340 is characterized by workflow analysis and associated decision making, whereas production 342 is characterized by transaction processing. Message traffic 346 for business control 340 is conversational, whereas in the production domain 342 message traffic takes the form of structured data. In production 342 the nature of interactions 348 is structured and sequential, whereas in business control 340 the nature of interactions is less structured and less determinate, being asynchronous and in bursts across the network. When these differences are understood it becomes clear that business control requirements 340 cannot be adequately met by the process automation based designs characteristic of the production domain 342. On the other hand, the CBM design is consistent with a process design as well as a component based design. That is, the CBM design allows for the realization of a process design as a more constrained instance of a component based design, without the additional context provided by static designs 282 and without the organizing framework provided by the business schematic 286, and without the resulting conformity of business blueprints 292 to an organizing framework.

Figure 3C:
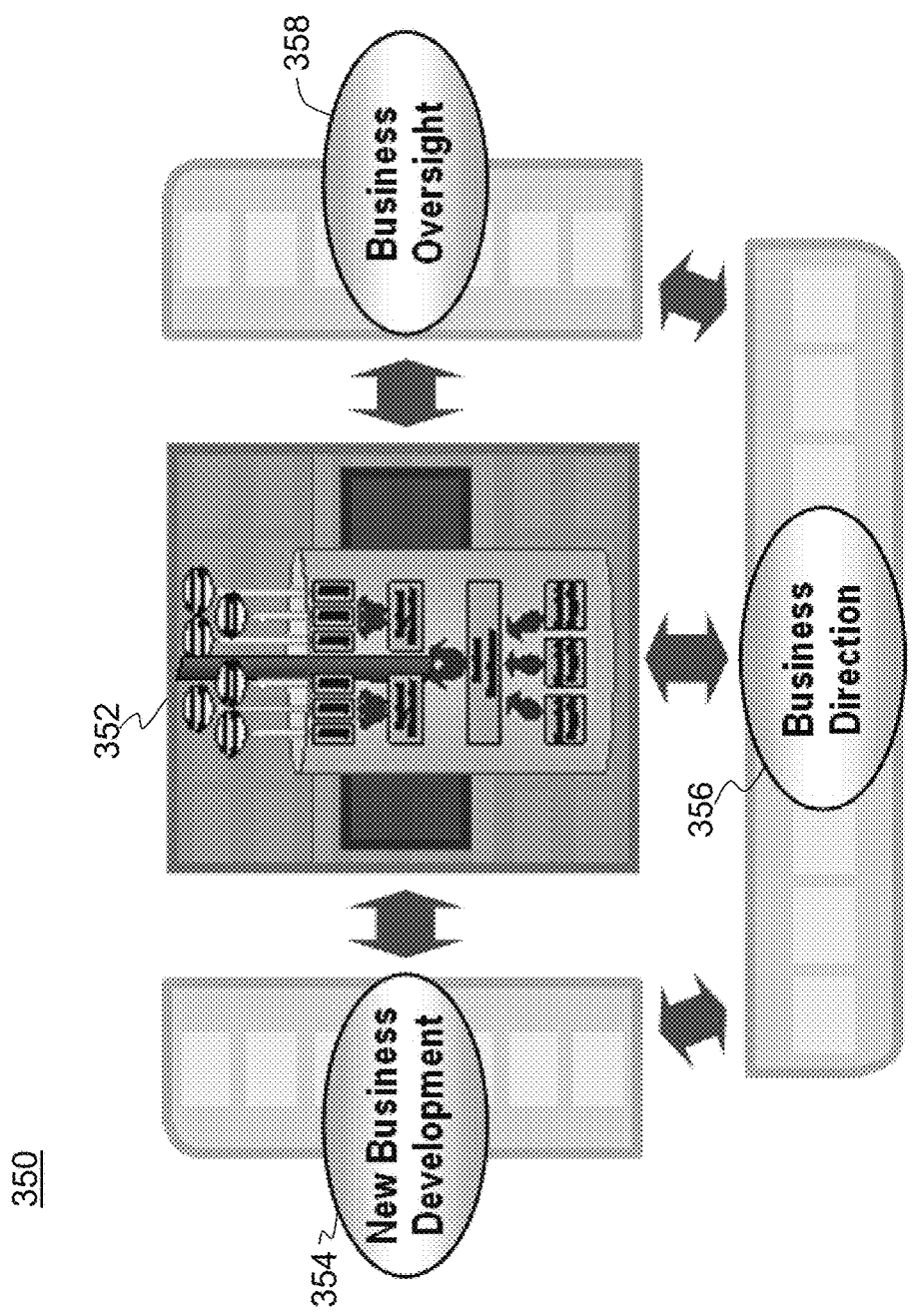
FIG. 3C is a schematic representation of a business model innovation having an expanded role for business control with reference to production.

The advantages of a design approach that begins with alignment of the enterprise with a component business model and its corresponding service collaboration networks include better use of production functionalities in pursuit of improved business control. As shown in FIG. 3C, a CBM aligned model 350 enables the production functions 352 to be understood and provided with support structures for enhancing new business development 354, business direction 356, and business oversight 358. Effectively, this design approach provides the old process oriented production pipeline with collaborative handles better suited than process structures to serve the need for business controls to adapt to changes in the market place. Indeed, these collaborative handles and alignment to a component business model may facilitate a determination by the business whether a capital intensive ability to manufacture at the core of the supply chain is a competitive advantage, or whether the manufacturing capability can be undertaken as a specialty and integrated into the business via a collaborative network.

Figure 3D:
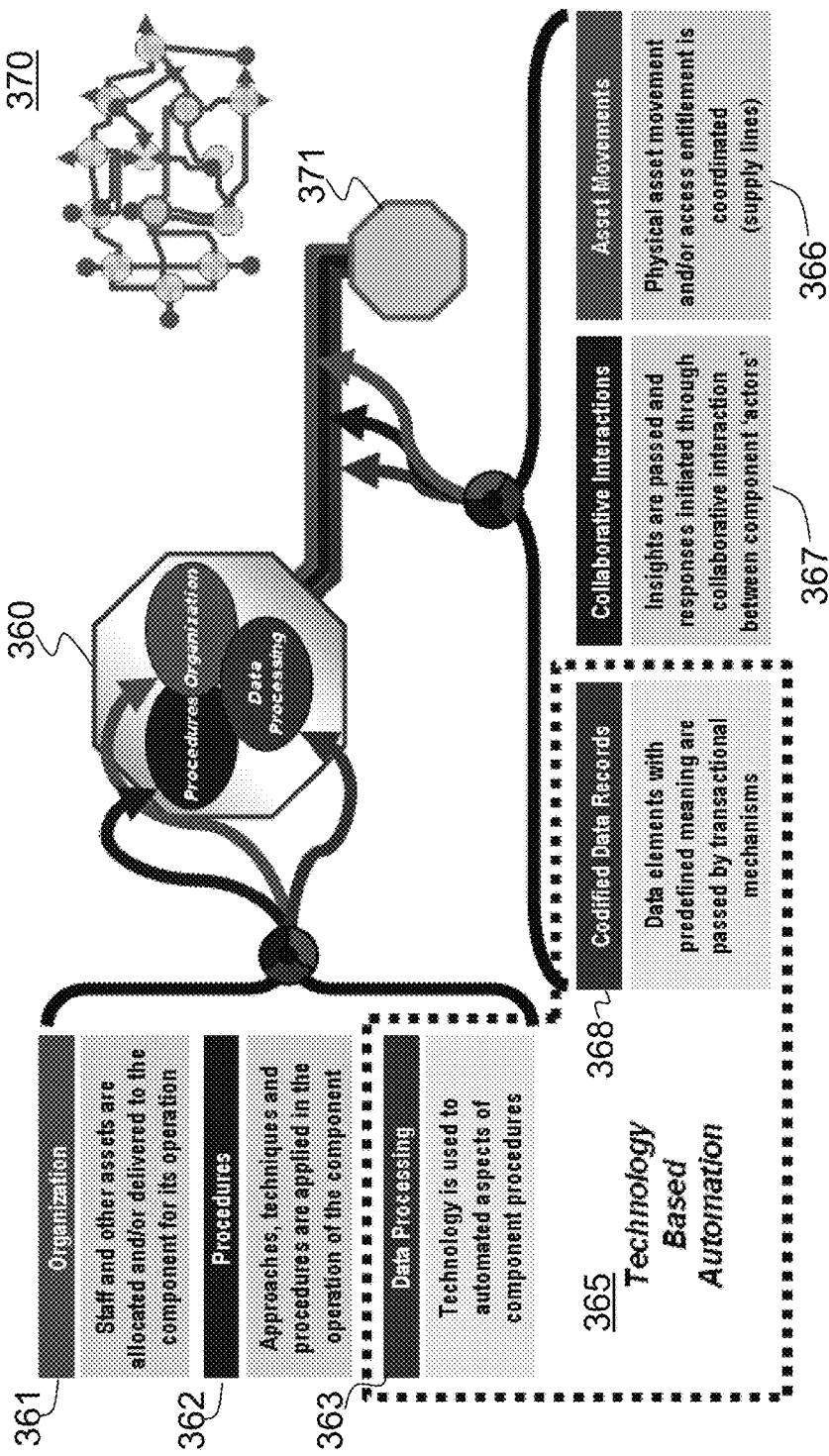
FIG. 3D schematically illustrates the full scope of a service center component design.

The full scope of a service center component design is shown schematically in FIG. 3D. Component 360 is supported by organization 361, procedures 362 and data processing 363. The organization 361 comprises staff and other assets allocated or delivered to the component for its operation. Procedures 362 comprise the approaches, techniques and procedures that are applied in the operation of the component. Data processing 363 refers to the technology used to automate aspects of component procedures. It should be noted that automation of the component's procedures refers to procedures internal to the component. The technology based automation 365 serving the component also includes codified data records 368, which are data elements with predefined meaning passed as output from and input to the component by transactional mechanisms.

Component 360 is part of service network 370, of which component 371 is an exemplar for the purpose of showing collaborative interaction 367 between component 360 and other components (e.g. 371) in the network 370. Insights are passed and responses initiated through collaborative interaction 367. In addition, asset movements 366 accounts for physical asset movement and the coordination of access entitlement to and from the component 360.

It is worth noting that this approach provides the context for making the decision as to what aspects of the business interaction between components are suited to machine/machine interaction, what aspects are better done with a user interface on one side of the interaction, and what aspects are best done outside the technology. The level of mechanization can often have a large impact on business behavior. Consider, for example, how the music industry changed when music became available as machine data over the Internet rather than on the physical media of a record or compact disc. To take just one component affected by such a change, assume a "Product Fulfillment" component had been responsible for tracking status of delivery of an order placed by a customer.

In the early days of the music business, for a small distributor, such a component might have been staffed 361 by one person keeping a simple log 362 of orders with columns for noting the date of the order, the date the order was delivered to shipping, and the date the order was shipped. The first log entry might have depended upon a communication 367 from a sales person identifying the customer and product, and the second log entry might have reflected a communication 367 to a shipping clerk, who would report 367 back when the shipment was mailed 366. It is possible that a single document—an order tracking form—might have been developed to serve as the vehicle for these communications and the source of information for the log, thus providing a better audit trail for the transaction.

Technology based automation 365 might then have been applied, first to automate 363 entries 362 in the log book by the allocated staff 361, and then to structure 368 the collaborative communications with the salesman and the shipping clerk. This might begin with automated assistance for generating and controlling order numbers on the sales side and tracking numbers on the shipping side, and evolve toward automating the order tracking form and either replacing the allocated staff 361 with a computer implemented agent, or perhaps using allocated staff 361 for a quality control function 362 over operation of the now automated procedures 362 for handling the log and the order tracking form.

If distribution of music media shifts from physical records and compact discs to Internet downloading, the salesman and the shipping clerk may be replaced (or supplemented during a transition period) by a web access interface, but the "Order Fulfillment" component might continue with its computer implemented agent, which would now collaborate 367 with the web access program (or a database serviced by the web access program) to collect order fulfillment information to be monitored for quality control purposes, which might be expanded by allocated staff 361 to include a variety of metrics associated with order fulfillment.

Thus the business design approach underlying the present invention provides flexibility in focusing attention on what the enterprise needs to do well to accomplish its mission. This flexibility holds promise for improvements in the commercial ecosystem as outlined in FIGS. 4A and 4B. In the current manufacturing centric environment 410 product pipelines deliver to localized distribution capabilities. The bases of competition 460 are product features and a supply line presence. The supporting role of information technology (IT) 470 is primarily process automation.

The asset based component business model (CBM) design approach redirects a process orientation to components whose assets are commercialized as services. The service centered business designs 415 that flow from this approach provide a basis for traditional manufacturing 'monoliths' to focus on their competitive strengths and divest themselves of functions in which they are less competitive than alternatives that are available through alliances. These alliances provide access to both commodity and best practice capabilities, based upon a certain commonality of components within an industry that facilitates in-sourcing and out-sourcing flexibility. Collaborative linkages between components remain operable whether linked components are in-sourced or out-sourced. This "plug and play" aspect is a consequence of the asset based design that is the premise of the present invention. The driver, enabled by componentization of assets, is to improve performance but without changing the 'footprint' of the business within its market or without changing the boundary of the market segment.

Initially, therefore, this is likely to result in a segment ecosystem 420, where a service center organization enables best practice leverage across manufacturing pipelines within the market segment and along the full supply line. The bases of competition 460 now include a value network presence as well as product features. IT's supporting role 470 expands from process automation to include structured collaboration within the segment's value network. As organizations both specialize in their areas of strength and divest of their non-competitive capabilities this leverage is likely to be contained initially within established market segments. But in time this market segmentation will be eroded as ways are found to support common requirements across segment boundaries through use of standard business control structures 425. Commercial asset types and control mechanisms are similar if not the same regardless of industry, so it is inevitable that as specialists focus on providing services associated with selected components they will discover that they can offer their services beyond the established industry relationships.

The development of solution arbitrage across market segments 430 reflects standard service center specifications, enabling best practices in one segment to be used effectively in another segment. The bases of competition 460 include a cross segment presence and service features provided by specialists. Generic service centers are developed by organizations that offer commercial services that can be configured for many different market segments. These service centered offerings will cross pollinate approaches across segments leveraging or 'arbitraging' best practices and scarce resources. This practice erodes the product, geopolitical and organizational scale boundaries that have traditionally defined market segments. Some examples of specialized cross market segment capabilities already exist such as market research, customer behavior modeling, consumer credit rating and many more utility type business functions in staff and facilities administration and finance.

In most industries today cross segment capabilities represent the exception with the significant majority of business activity being tuned to the nature of the underlying product. An implication of the componentization of business and the disassembly of the production line is that such product specific features become more narrowly concentrated within the core manufacturing area and more generic capabilities can be used to support the significant remainder of business activity, first within the ecosystem segment 420 and then across segments 430.

Operational improvements in the ability to leverage best practice service centers across segments can be expected to support a rapid business assembly capability 435, resulting in more dynamic alliances and the development of transactional organizations 440. As the coverage of more general business service centers expands, service standards, operational approaches and system solutions will streamline the process of establishing inter-organizational links. Improved business control approaches will support the rapid setup of organizations to target opportunities. This will support highly dynamic commercial alliances that might exist for the duration of a single major transaction or market opportunity. In this environment the bases of competition 460 include a presence in the broader ecosystem and the development of innovative business models for leveraging dispersed assets to meet market place targets of opportunity. The supporting role of IT 470 includes the administration of this ecosystem.

As commerce acquires the operational stealth to assemble 'transactional alliances' 440, the key determinants of success become access to critical manufacturing assets such as raw materials and intellectual property and the subsequent ability to deliver both virtual and physical product through appropriately configured supply channels. This developed ability to engineer the exchange and distribution of assets on a global basis 445 is the foundation of an ecosystem 450 focused on global sourcing and supply-line optimization for a localized supply. Access and distribution of commercial assets is managed globally. The bases of competition now include access to these assets and supply-lines. The supporting role of IT 470 includes the exchange and distribution of these assets.

As service organizations develop more and more capabilities that can be offered and deployed across multiple segments the possible reach of the business ecosystem grows. This expansion will cross not only product boundaries but also geopolitical borders, in a globalization process that is well documented. It is less obvious how the same factors that are removing the manufacturing pipeline constraints noted above are making it increasingly easy for small and mid size firms to play alongside the large multinational players. The removal of product, geopolitical and organizational scale boundaries that are expanding the market ecosystem is counterbalanced by factors that constrain the practical growth of any one organization within the ecosystem. These include the need to focus on narrow areas of specialization to be competitive and the need to adjust to limitations in the number and complexity of connections that can be managed effectively. While the improvements provided by the present invention enable business designs with supporting IT able to manage a connection complexity well beyond that of the film industry described using FIG. 3A, there remain limitations and further opportunities.

Once business has embraced the specialized service model and started to align to a component business model, subsequent barriers to change can fall more easily. This is because subsequent steps do not require the resolution of complex technical problems but are driven more by considerations such as organizational re-structuring and market adoption that can as much trigger as impede change.

Figure 4A:
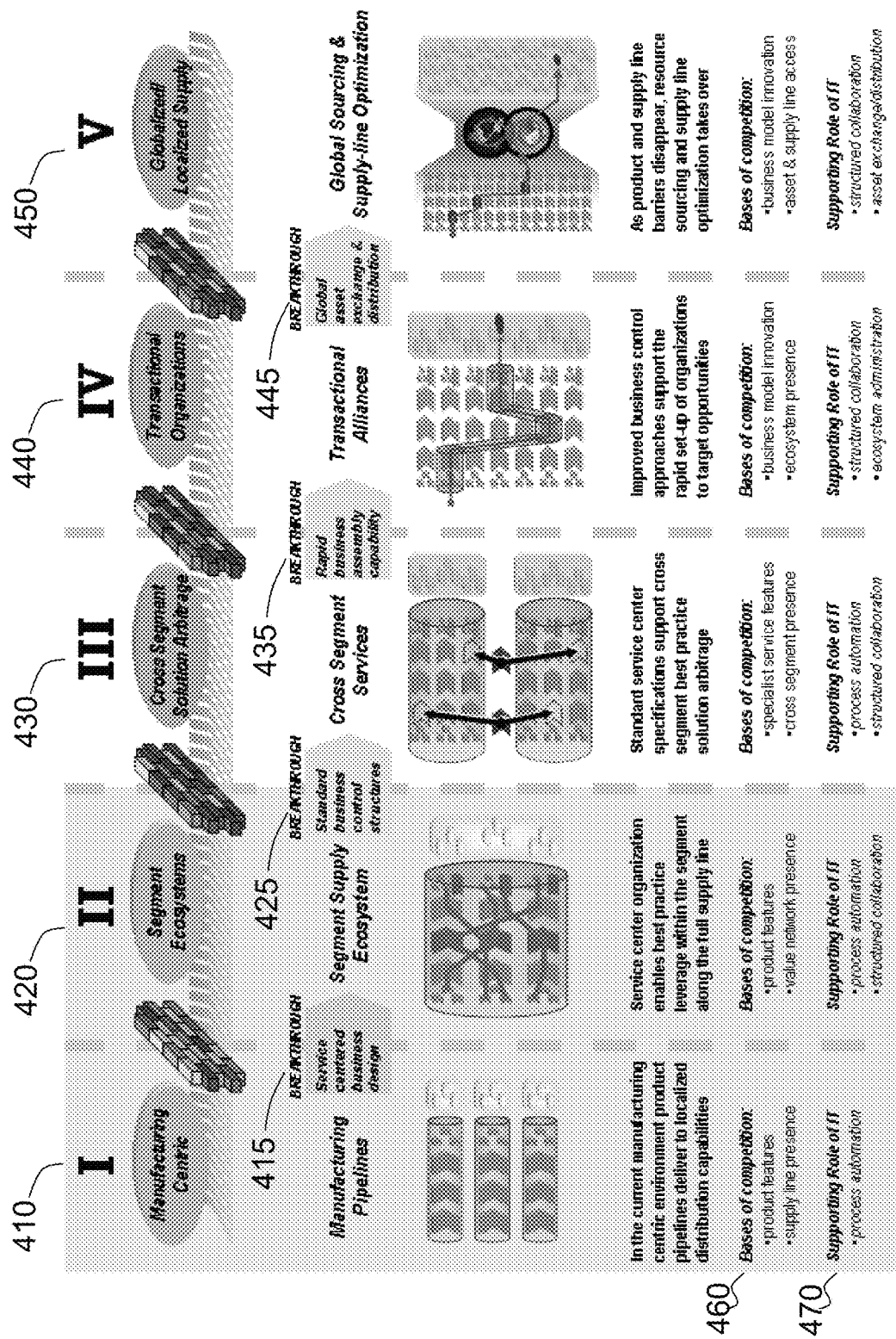
FIGS. 4A and 4B are charts showing stages of market ecosystem evolution under an architecture using an asset based model.

To summarize the factors driving the changes reflected in FIG. 4A include:

business and market componentization—the progressive migration to organizational structures that are an assembly of specialized and optimized business 'building blocks';

cross segment solutions—the evolution of service organizations offering building block solutions that can be configured to support multiple market segments; and support for more dynamic alliances—improvements in operational and technology approaches that support the more dynamic and responsive assembly and dissolution of organizational alliances within the growing market ecosystem The evolution of commerce through the five stages shown in FIG. 4A does not need to follow in strict sequence nor does every aspect of any one organization need to evolve in concert. In practice most organizations will evolve selected parts of their business at different rates along the continuum and will also probably hold on to elements that might be better supported through external sourcing due to organizational inertia or their limited capacity to handle change.

As long as the transformation remains between established players in a segment it's a fair race. As the markets and available solutions mature towards later stages however, opportunities open up for new entrants to enter the fray. These will have the distinct advantage of not carrying the legacy inertia in their systems and workforce as they organize to meet market demand.

FIG. 4A highlights the current focus on generally anticipated changes brought about by componentization—from Stage I 410 to Stage II 420—and also suggests other more radical changes that might follow—Stage III 430, Stage IV 440 and Stage V 450.

Figure 4B:
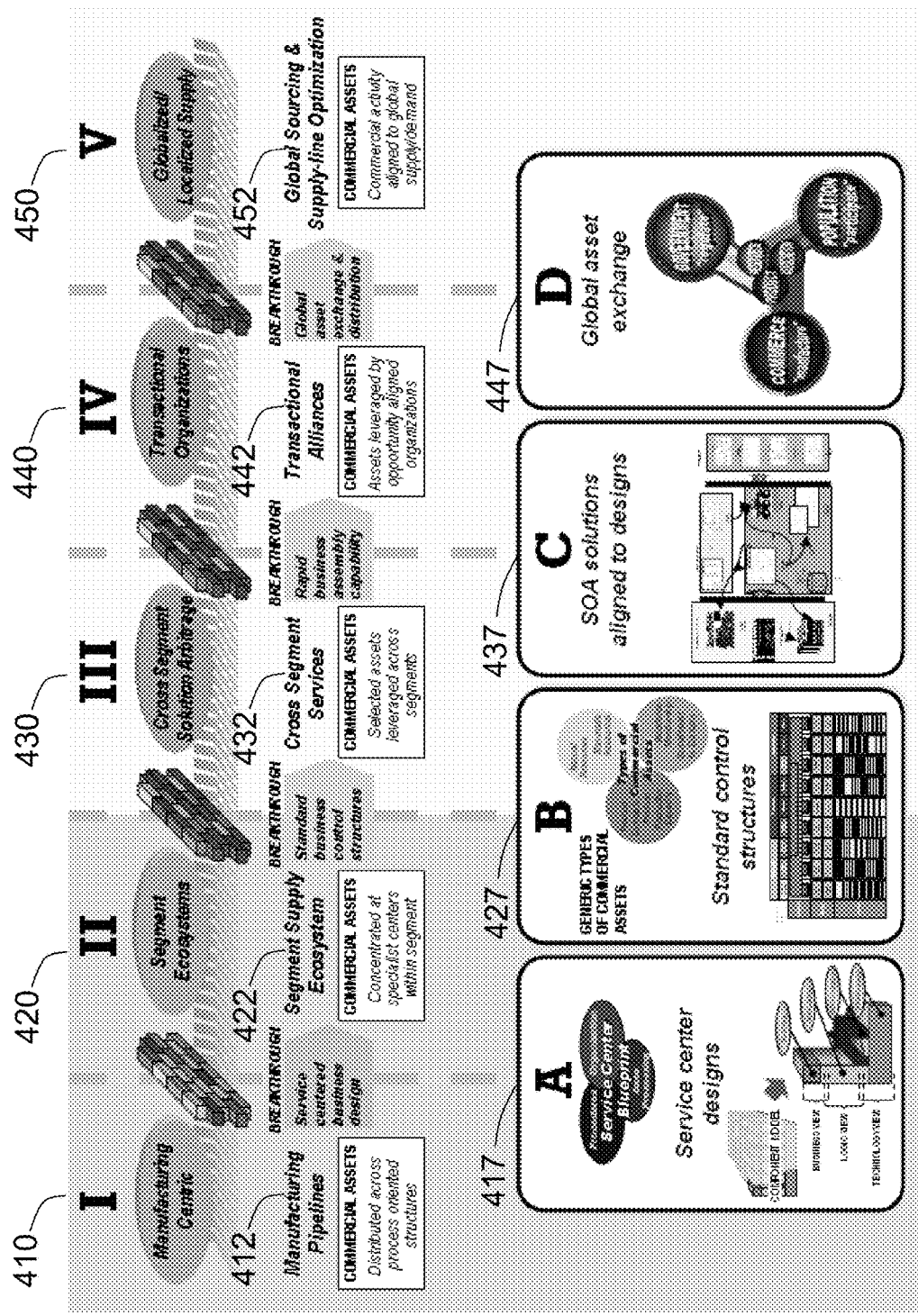

FIG. 4B adds certain elements to the display presented in FIG. 4A, describing how commercial assets are handled at each stage and identifying facets of asset based design enabling transition from one stage to the next. In the manufacturing centric stage 410, characterized by manufacturing pipelines 412, the assets of the enterprise are distributed across process oriented structures. Transition design feature 417 is service centered business designs 415, exemplified by linkage to service oriented architecture (SOA) solutions. These designs define a logical business partition based on a specialization for which organizational, procedural and IT supporting requirements can be determined along with a specification of the boundary and external business messages interface.

In the stage 420, characterized by the formation of ecosystems aligned to respective market segments, commercial assets 422 are concentrated at specialist centers within a segment. The design feature 427, which enables transition to the stage 430 that leverages solutions across segments, is the standard control structure. As general asset types and commercialization mechanisms are defined, a standard collection of generic control structures can be specified. These generic control structures can be deployed across industries.

This aspect of control structures has implications for the nature of solutions that are developed conforming to an asset based design approach. For the specification of the control mechanisms the asset based design approach distinguishes between the purpose or role, which does not vary particularly, and its particular implementation that does evolve as new practices are discovered or invented. Asset types are not specific to any one industry. Items such as staff, buildings, equipment, knowledge, customer relationships occur in many if not all industries. Similarly and consequentially, the commercialization mechanisms associated with the use of a generic asset type are themselves fairly generic. For example, for the asset type customer relationship, the associated commercialization mechanism 'account for payments/receipts' is a general requirement.

Industry specific requirements (and other reasons for specialization such as geopolitical, scale or sophistication) are related to specific features of the implementation of the commercialization mechanism rather than its purpose or role. Since purpose or role of an asset type is generic, it therefore follows that the control structures and their generic implementation features are transferable between industries. In addition, of course, it is possible that even the non-generic implementation features developed in one industry may be harvested for redeployment in other industries as a new differentiating feature. This would be an added benefit, but seeking these benefits should not obscure the basic reusability across industries of the generic implementation features of control structures aligned to the purpose or role of an asset type.

In the cross segment services stage 430 selected assets 432 are leveraged across industry segments. The transition to organizations built around particular transactions 440 is facilitated by consistently aligning 437 service oriented architecture solutions to asset based business designs. The feasibility of this approach has been demonstrated for a meaningful sample of business component designs, and over time this will support the rapid assembly and disassembly of alliances in the commercial ecosystem 435. In these transactional alliances commercial assets 442 are leveraged by being able to be applied to a transaction through an opportunity aligned organization. Finally, as support for the transactional organization 440 is established, the primary basis for competition becomes access to, and effective distribution of, critical commercial assets. This competitive environment can be expected to generate global asset exchange mechanisms 447, which transition to a global sourcing and supply-line optimization regime 452 where commercial activity is aligned to global supply and demand.

The role of information technology, in the above described developments toward componentization of the business enterprise, is challenging. The most straightforward application of information technology is automated support for repeatable production processes, as described for the manufacturing centric stage 410. This appears to suggest that large size and economies of scale are likely attributes of an enterprise optimally supported by IT. However, a contrary conclusion is suggested by evidence of the use of asset based designs in stages II, III and IV. This evidence, accumulated in the financial services industry, suggests that small and mid sized businesses are less constrained by their computer systems than the larger firms. The causes have been traced to the much smaller system portfolios and the corresponding reduction in the number of business connections needed to manage the business. It can be shown that as a business grows linearly the number of business connections grows to the power of two.

Thus the early experience with service centered operational design has revealed two implications for the future direction of asset based business designs that appear to address the problem of scale complexity, at least in part:

Specialization reduces the number of necessary business connections.

As organizations focus on those areas of competitive strength and divest of other areas, though their capacity to handle business volume can increase, the range of activities they need to coordinate is reduced.

Interactions are simplified.

An interesting and less obvious effect of operational specialization is that the 'traffic' making up the business connections is simplified. In a traditional process model all parties involved in any stage of execution need to have expertise relating to whatever the kind of item the process operates on (for example, the set-up, maintenance and eventual closing out of customer agreements). Much of the traffic between stages involves passing transactional detail between parties as they coordinate to process items. In the specialist service center model, this expertise is encapsulated in each single center that is responsible for its type of item for the full life-cycle (e.g. a full life-cycle customer agreement specialist). The traffic between service centers contains less transactional data being more about operational coordination between specialists.

Figure 5A:
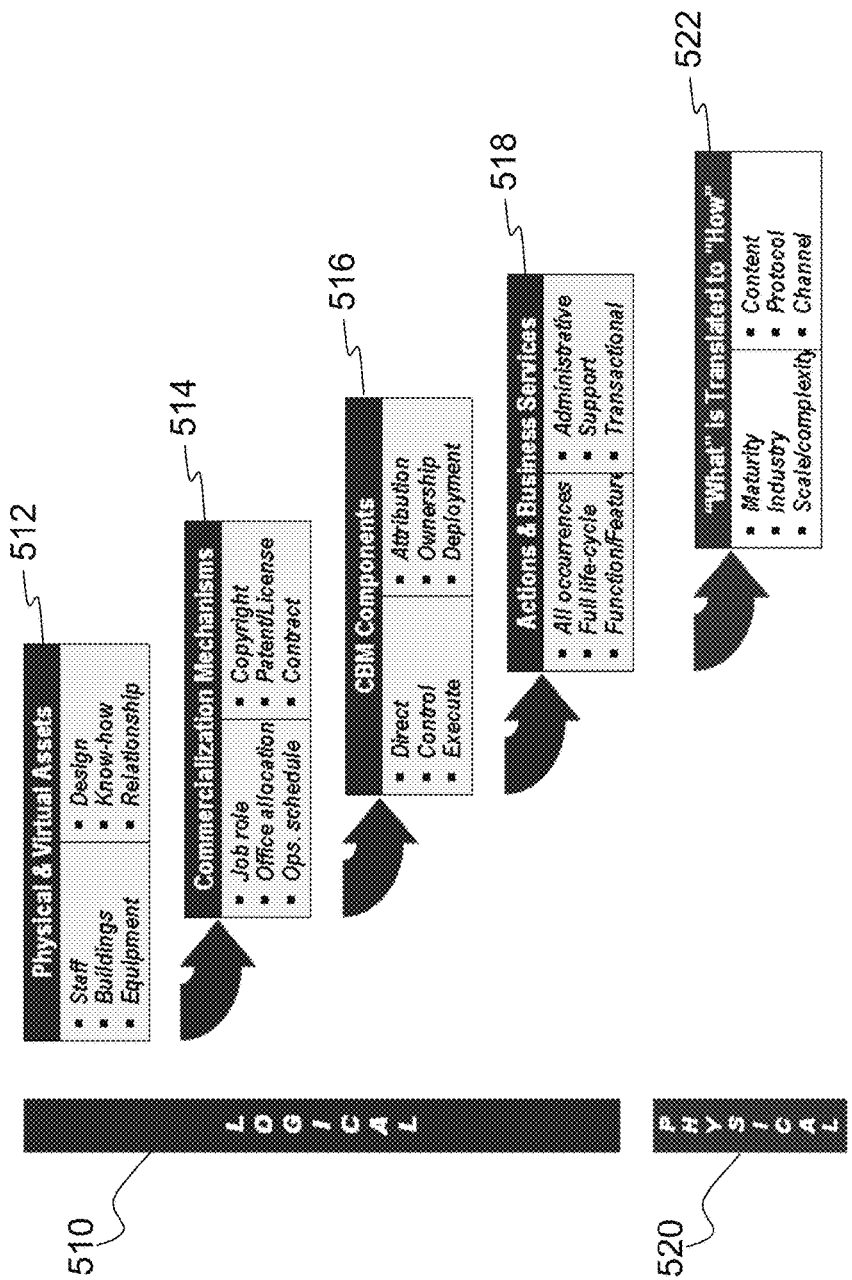
FIG. 5A is a diagram showing a layered hierarchy of designs to support commercialization of assets.

The design approach of a business architecture using an asset oriented design is shown schematically in FIG. 5A. The logical decomposition hierarchy 510 includes a number of elements. Physical and virtual assets 512 are identified at the top of the hierarchy. These assets include staff, buildings, and equipment, as well as the virtual assets of designs, know-how, and relationships. These assets are made valuable by commercialization mechanisms 514. Examples include a job role (for staff), an office allocation (for a building), and an operations schedule (for equipment). Copyrights, patents, intellectual property licenses, and contracts are examples of commercialization mechanisms for virtual assets.

Next in the hierarchy are the components themselves 516, each of which is a locus of identified assets and commercialization mechanisms. Components are more fully described above and in the foundation patent application. The actions and business services 518 performed by the components 516 form another stage in the decomposition. This level 518 of the design approach covers the functional features of each service provided by the component, the instances and life cycle of the service, as well as administrative, support and transactional aspects. Finally, at the physical level 520, an implementation design 522 translates component activities so as to identify the channels, protocols and content associated with the services, together with notations regarding the industry involved, the maturity of service solution provided, and its scale and complexity.

Figure 5B:
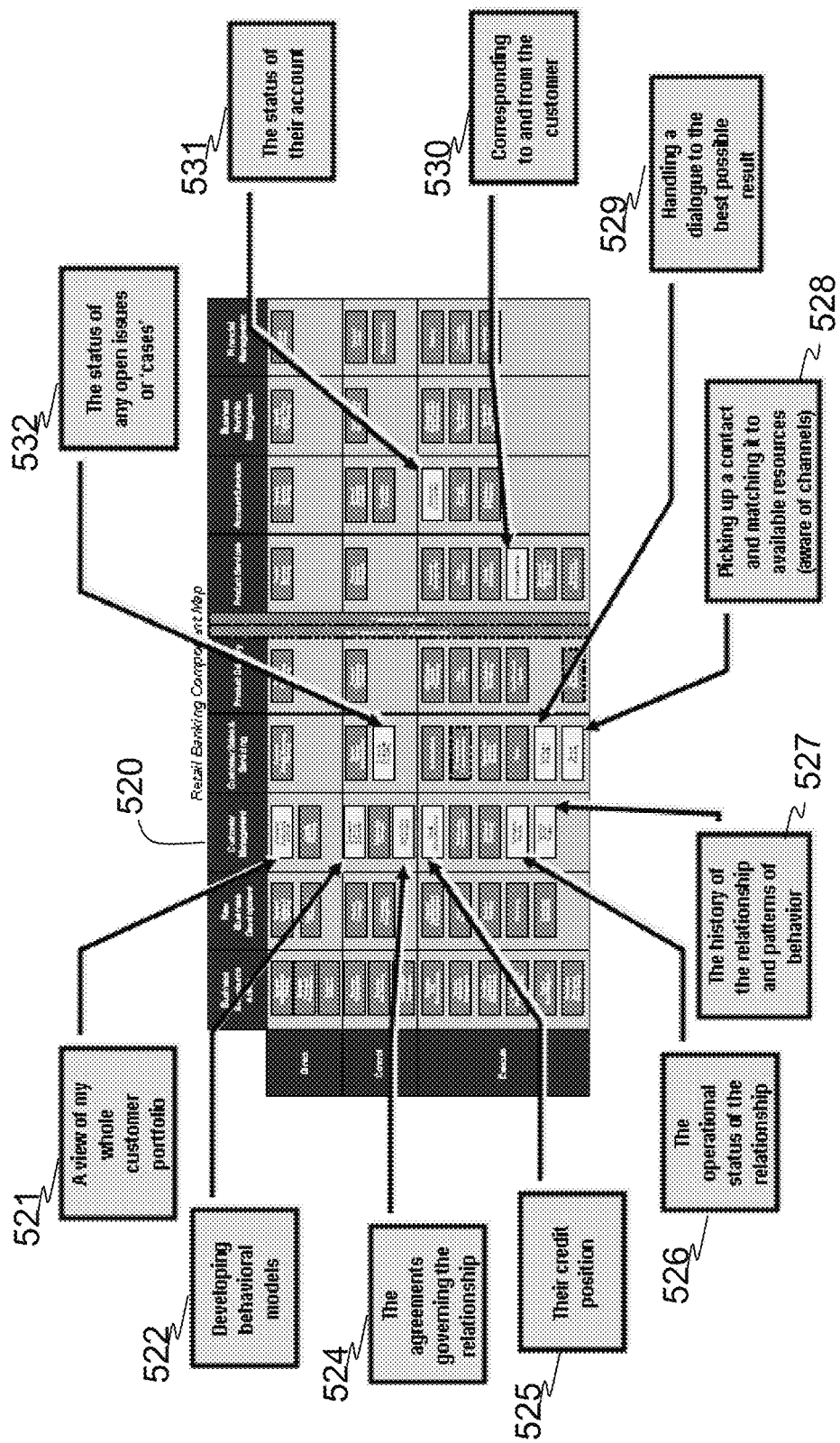
FIG. 5B is a schematic showing CBM control mechanisms applied to exploiting the asset type "customer".

FIG. 5B highlights control mechanisms in one exemplar service network of components organized in CBM map 520. The control mechanisms in this customer resource management service network highlight examples of common control mechanisms applied to leverage a particular commercial resource type, namely, the resource type "customer relationship". This is an intangible but very important business asset. The control mechanisms for commercializing this asset are: a view of the customer portfolio 521, behavior models 522 that are being developed, agreements governing the relationship 524, customer credit positions 525, the operational status of the relationship 526, the history of the relationship and patterns of behavior 527, a channel awareness function 528 for picking up a contact and matching it to available resources, a function for handling a dialogue to the best possible result 529, corresponding with the customer 530, the status of the account 531, and the status of any open issues of 'cases' 532.

It should be emphasized that the functionality of the asset based component design approach underlying the present invention depends upon a realistic and objective view of business assets. This view typically identifies assets that may be denominated "intangible" as well as "tangible" in conventional parlance, but these distinctions are misleading because component structures are a representational convention ultimately derived from and connected to the physical structures of the business: its people and its other material resources, its products and services in the marketplace, and its customers. In order to usefully and effectively describe the activities which need to be undertaken by the business it is essential to identify within the component structure asset views—such as the "intangible" asset of "customer relationship"—that best facilitate the development of control structures that commercialize the asset.

Figure 5C:
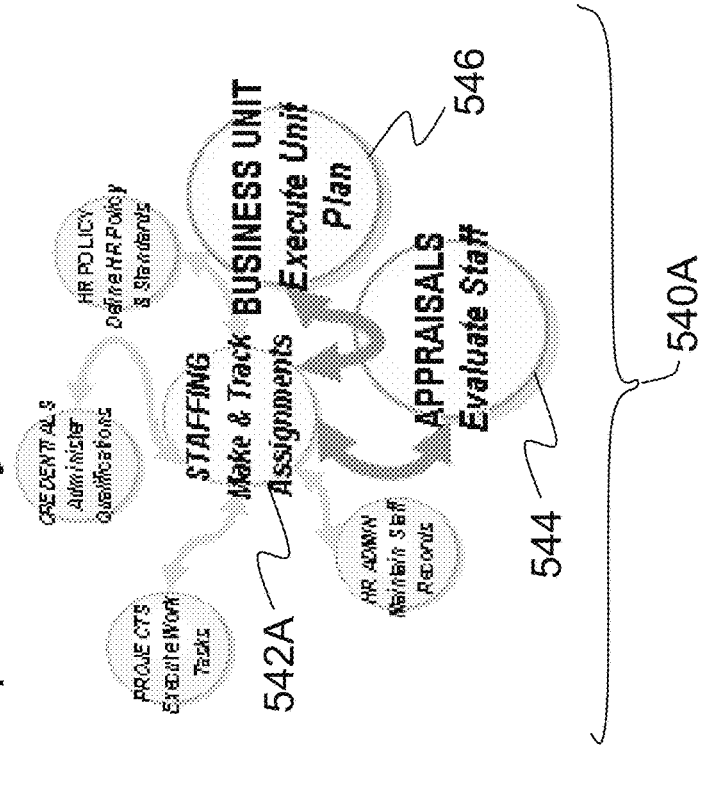
FIGS. 5C and 5D show a business control lattice and its enhancement, respectively.
Figure 5D:
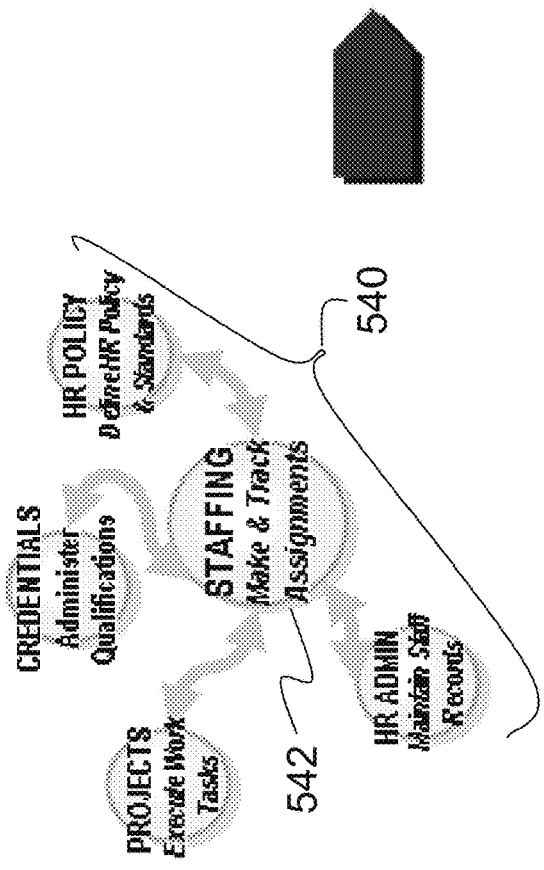

This service network will be arranged to show the operational connections between the components, in the manner described for a simpler network 540 shown in FIG. 5C. The network structure and the flexible collaborative mechanisms employed by components in the network simplify enhancements of the network, as shown in FIG. 5D. Service network 540 provides the ability to staff projects effectively, using four business control elements (i.e. PROJECTS for the execution of work tasks, CREDENTIALS for the administration of qualifications, HR POLICY for defining HR Policy and standards, HR ADMIN for maintaining staff records) each collaborating with a STAFFING element 542 for making and tracking assignments. To improve the enterprise's ability to re-allocate staff an APPRAISALS business control element 544 and a BUSINESS UNIT element 546 for executing a unit plan are added, with collaborative links to STAFFING element 542A, as shown in FIG. 5D. The resulting service network 540A provides an enhanced staffing service to the enterprise.

Figure 5E:
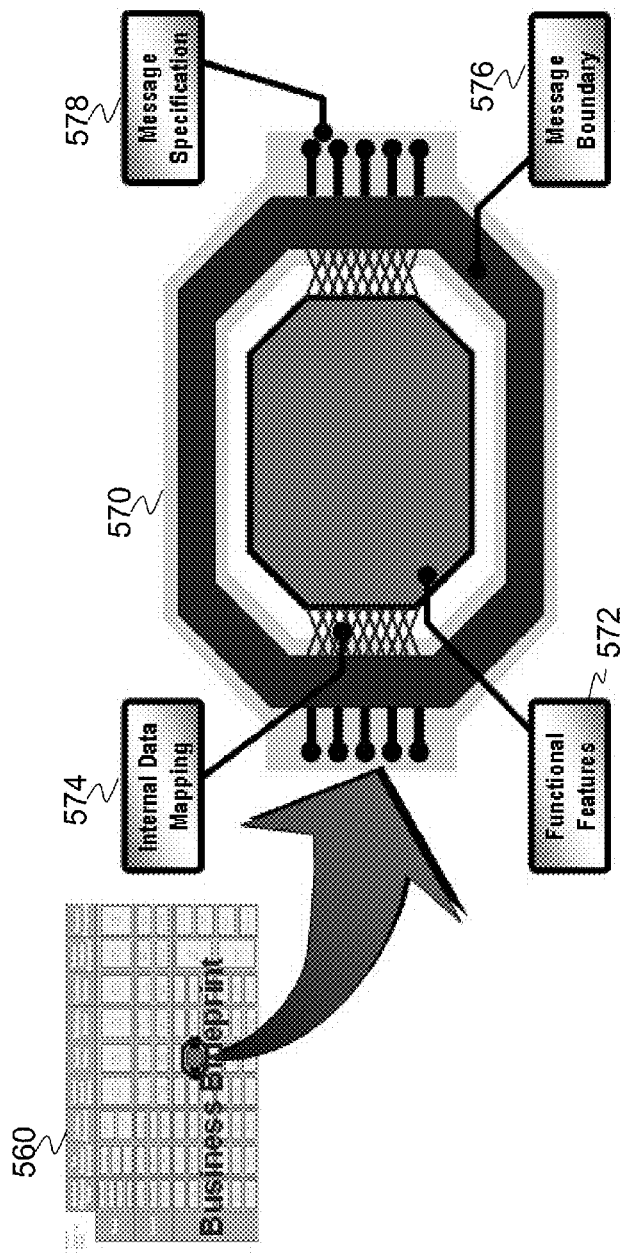
FIG. 5E is a schematic diagram showing the structural elements of a service center component.

The flexible enhancement example illustrated in FIGS. 5C and 5D is enabled by components whose collaborative abilities are disciplined in accordance with the structure shown in FIG. 5E. Components are defined in a non-overlapping and comprehensive manner as described above and in the foundation patent application for the asset based component business model, and arranged on a CBM map 560. Each component added to a service network—which may be done incrementally, e.g. component 134 shown in FIG. 1C—is provisioned for collaborative support as shown in FIG. 5E. Component 570 is characterized by functional features 572. Internal data mapping 574 and message specification 578 needed to support the commercialization mechanisms and control structures of the component 570 are connected through message boundary 576. Internal data mapping 574 is a "standards" based mapping of information using meta data to link to legacy data structures. Message specification 578 provides definition of the business services provided by the component, along with an hierarchical decomposition to the underlying services provided through the technology layer supporting the enterprise. A structured breakdown of prevailing practices functionality (for legacy system alignment) is described by functional features 572. Message boundary 576 provides a buffer that effectively wraps a service envelope around component 570, including interim capabilities designed to mask limitations reflecting staged development of the component 570. The design encapsulates specific business expertise within the component, leading to service specifications that are optimized and re-usable.

It should be emphasized that these structural disciplines, including the commercialization mechanisms and control structures, are an important and enabling aspect of the asset based model and design principles upon which the present invention is based. These disciplines are in contrast to the film industry example described above in connection with FIG. 3, where the elemental building blocks of assets correspond closely to the job specializations of people working in the industry, and where the nature and complexity of the interactions between these people tend to be well defined and involve the transfer of limited amounts of information that can be handled adequately by conventional support technologies such as the telephone and electronic mail. In order to enable effective collaboration in a generic business service network specific systems approaches are needed. In general, the elemental building blocks (i.e. components) for a medium or large scale business do not neatly align with a consistently defined role that can be supported simply by engaging an individual.

In conventional systems design the approach is to analyze a process and decompose it to ever increasing levels of detail until the elemental steps in the process can be rendered in a software design. This technique is reflected in many established software development approaches that are collectively referred to as procedural design and development techniques. A second approach to software development uses a different model, one of simulation where the software is aligned to an object which can be a tangible or intangible real world entity and the computer program is design to represent properties and behaviors of this object. This approach is referred to as object oriented design and development.

In process design it is necessary to analyze and interpret the business behavior to a low level such that a computer program can be written to automate elemental steps in the process that can be accurately defined in unambiguous mechanical terms. In object oriented design similarly the business activity needs to be taken down to a low level where a specific action can be 'mechanised' in the computer based simulation of the business object—for example a simulated phone can be made to dial a number.

This present invention defines a new approach to solution design where the software is aligned to the implementation of a specific control mechanism associated with the leverage of a particular asset type. In the business design approach upon which the present invention is based, the elements of business operation relate to a higher order structure—a commercialization mechanism associated with the use of a type of asset. Examples might include making a work assignment (the commercialization mechanism) for a member of the workforce (a type of asset); or scheduling a product production run (the commercialization mechanism) for a production plant in Korea (the asset type). When assembling the business control systems for a commercial organization using systems aligned to these structures a different approach is enabled.

Instead of having to consider every possible business activity and decomposing it down to elemental activities that can be unambiguously mechanized, the approach is to select the required commercialization mechanisms needed to leverage the asset types employed by that organization. If the organization has manufacturing capacity (a type of asset) it will need a collection of the associated commercialization mechanisms (for example production scheduling, production operations, production facility maintenance).

How this works may be understood by several analogies. The decomposition undertaken by the process approaches (either procedural or object oriented) assumes that the process must be described at the lowest level of detail required for software implementation. In effect, there are no higher level rules. But what if there exists a higher level structure that is not taken into account by the process decomposition approach? This may be likened to "decomposing" a diamond in the rough by reducing it to dust, failing to strike the raw stone at the correct angles to expose the facets of a true gem. The business architecture upon which the present invention is based—the asset based component business model (described in the above referenced foundation patent application as "CBM"), coupled with the above described service center structures for the components—provides a "view" of business architecture that enables the analysis to expose business components in a way that produces results that are both simpler and more flexible than the traditional process approaches.

Another analogy for the improved structures put to use by the present invention is poetry. A sonnet or a haiku provides certain rules, but within the framework provided by these rules there is considerable freedom. These rules are chosen with care, like the facet angles of a diamond, and provide a simple yet elegant economy. Applying this metaphor to the business architecture described above using asset based components, the "rule" that control structures operate at the same level of granularity as their corresponding components is simple, yet elegantly enabling for the present invention. As noted in the foundation patent application, a complex of several hundred business processes is reducible to a much smaller number of asset based business components.

By focusing on the assets allocated to a component, and the commercialization mechanisms for using these assets to bring value to the enterprise, the corresponding control structures naturally align to the component. By contrast, the process approaches have no point of leverage for stopping a decomposition that effectively "mechanizes" particular examples, grinding the diamond into dust. There is no room for adaptation to the range of possibilities that a truly competitive responsiveness to the market place requires. "Mechanization" breeds lethargy. The component aligned control structures of the present invention have several distinct advantages: they are at a level that is generic and therefore reusable, and also able to accommodate a range of possibilities that provides flexibility; yet because they are aligned to components they acquire the relative stability that characterizes the assets upon which the components are based.

The associated control structures provide systems solutions that support these commercialization mechanisms. These business control elements (BCEs) can be selected, configured to operate as needed for this particular organization and then assembled to provide an integrated control infrastructure. The individual control structures will need to support an equivalent level of detail to the mechanized requirements in the traditional context of building solutions, and are enabled to do so in the above described alternative to "mechanization". But the key difference with this approach is that the control structures are largely generic such that any underlying systems solution when designed to be configurable, can be re-used.

It is also the case that a systems solution built to support a business need conforming to this technique is not only re-useable when deployed for the same purpose in a different organization, but can be incrementally enhanced to support different combinations of behavior. In the example below control structures are first designed and built to support simple staff assignments in a manner that can be selected and assembled for re-use. An incremental extension of these control structures is shown next to the first design where new ingredients and behaviors are added to support a second, related but more sophisticated behavior.

Figure 6:
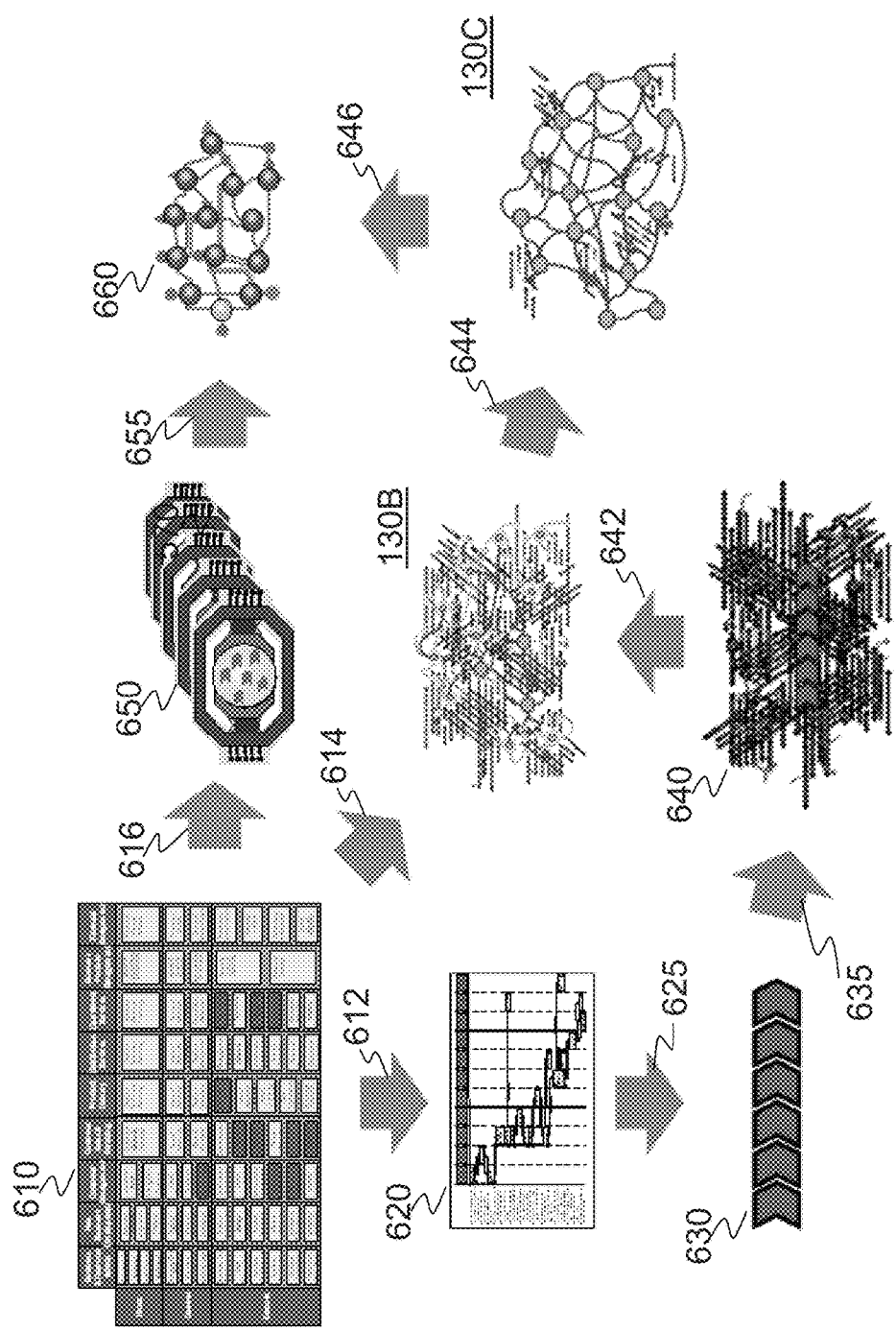
FIG. 6 is a schematic flow diagram showing alternative development paths toward reusable business control elements.

The preferred approach of the present invention may be understood with reference to the alternatives represented in the flow diagram of FIG. 6. The starting point is an industry CBM blueprint 610. The objective is a business system 660. The most direct route is provided by the method of the invention, by first identifying 616 general commercial control structures and configuring them within components 650 provisioned for collaborative support (as described above with respect to FIG. 5E). These components are then assembled 655 into service network 660.

This approach may be contrasted with a conventional approach initiated 612 by a process based analysis of business requirements 620. Typically, business requirements 620 are implemented 625 using a repository of service oriented architecture (SOA) process elements 630, which are then integrated 635 into the legacy environment 640. It is possible to proceed incrementally 642 from the legacy environment 640, as described above with respect to FIGS. 1B, 1C and 1D, by a "seed and grow" approach reflected in 130B and then progressing 644 toward a situation where the business has been substantially realigned to a component business model 130C, with a few remaining legacy processes. From this functioning CBM environment appropriate components can then be assembled 646 to achieve the desired service network 660. An intermediate approach would bypass the conventional process approach 612 and proceed directly 614 toward a "seed and grow" approach 130B.

The advantage of focusing, in accordance with the present invention, on a direct route to business solution 660 is that a series of these soon develops a critical mass able to address new requirements by adding features and services to established business service centered elements, as described above with respect to FIGS. 5C and 5D.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A computer implemented method for assembling business systems for an enterprise from re-usable business control elements, comprising:

partitioning the enterprise into non-overlapping components in a structural representation using the computer, said structural representation in a database on the computer being represented visually as a component map of a Component Business Model (CBM) of the enterprise, said partitioning taking assets of the enterprise and producing partitions (components) that are mutually exclusive and collectively complete, each said respective component including respective commercialization mechanisms for doing something commercially useful with said respective assets;

identifying one or more of said assets of the enterprise needed for a first business solution;

identifying one or more of said commercialization mechanisms needed to leverage the identified assets to provide the first business solution;

associating by the computer the identified assets and commercialization mechanisms with asset types and corresponding elemental control structures described on a generic component business model (CBM) map of elemental design elements; and configuring the associated elemental control structures to leverage the respective corresponding asset types to provide the first business solution, wherein an "elemental design element" is a component on said generic component business model (CBM) map defined by said assets at the lowest level of decomposition of the enterprise where the component has a single parent, and an "elemental control structure" is a control structure associated with an elemental design element.

2. The method of claim 1, further comprising:
providing a computer support system for one of the elemental design elements, the computer support system being aligned to the elemental design element and being aligned, in particular, to implementation of the elemental control structure for leveraging the asset type associated with the elemental design element.

3. The method of claim 1, further comprising:
assembling by the computer the configured elemental design elements into a service network for providing the first business solution.

4. The method of claim 3, further comprising:
identifying a second business solution, and second assets and corresponding second commercialization mechanisms needed to leverage the second assets to provide the second business solution;
identifying at least one elemental design element from the first business solution, each elemental design element being comprised of an asset type and corresponding elemental control structure, as reusable for the second business solution;
associating by the computer the remaining second assets and second commercialization mechanisms with asset types and corresponding elemental control structures described on said generic component business model (CBM) map of elemental design elements, said associating producing a second list of elemental design elements;
configuring the at least one elemental design element identified from the first business solution and the remaining elemental design elements on said second list to provide the second business solution; and
assembling the at least one elemental design element from the first business solution and the remaining elemental design elements on said second list into a second service network for providing the second business solution.

5. The method of claim 4, further comprising:
providing a second computer support system for said second service network, said second computer support system further comprising separate computer support systems aligned to each respective elemental design element in the second service network, each respective computer support system providing automated support for structured collaboration with other elemental design elements on the second service network.

6. The method of claim 5, wherein each respective computer support system is patterned after a template provided with a corresponding elemental design element on the generic CBM map.

7. The method of claim 6, wherein the second computer support system, comprised of separate computer support systems each patterned after a template on the generic CBM map, replaces a legacy process based system for supporting the second business solution.

8. The method of claim 4, further comprising:
providing automated computer systems support for said configuration and assembling steps by providing a display of the generic CBM map with a capability of selecting business components from the generic CBM map and with a capability of enabling configuring and assembling the selected business components.

9. A computer implemented system for assembling business systems for an enterprise from re-usable business control elements, comprising:
means for partitioning the enterprise into non-overlapping components in a structural representation using the computer, said structural representation in a database on the computer being represented visually as a component map of a Component Business Model (CBM) of the enterprise, said partitioning taking assets of the enterprise and producing partitions (components) that are mutually exclusive and collectively complete, each said respective component including respective commercialization mechanisms for doing something commercially useful with said respective assets;
means for identifying one or more of said assets of the enterprise needed for a first business solution;
means for identifying one or more of said commercialization mechanisms needed to leverage the identified assets to provide the first business solution;
means for associating the identified assets and commercialization mechanisms with asset types and corresponding elemental control structures described on a generic component business model (CBM) map of elemental design elements; and
means for configuring the associated elemental control structures to leverage the respective corresponding asset types to provide the first business solution,
wherein an "elemental design element" is a component on said generic component business model (CBM) map defined by said assets at the lowest level of decomposition of the enterprise where the component has a single parent, and an "elemental control structure" is a control structure associated with an elemental design element.

10. The system of claim 9, further comprising:
means for providing a computer support system for one of the elemental design elements, the computer support system being aligned to the elemental design element and being aligned, in particular, to implementation of the elemental control structure for leveraging the asset type associated with the elemental design element.

11. The system of claim 9, further comprising:
means for assembling the configured elemental design elements into a service network for providing the first business solution.

12. The system of claim 11, further comprising:
means for identifying a second business solution, and second assets and corresponding second commercialization mechanisms needed to leverage the second assets to provide the second business solution;
means for identifying at least one elemental design element from the first business solution, each elemental design element being comprised of an asset type and corresponding elemental control structure, as reusable for the second business solution;
means for associating the remaining second assets and second commercialization mechanisms with asset types and corresponding elemental control structures described on said generic component business model (CBM) map of elemental design elements, said associating producing a second list of elemental design elements;
means for configuring the at least one elemental design element identified from the first business solution and the remaining elemental design elements on said second list to provide the second business solution; and means for assembling the at least one elemental design element from the first business solution and the remaining elemental design elements on said second list into a second service network for providing the second business solution.

13. The system of claim 12, further comprising:
a second computer support system for said second service network, said second computer support system further comprising separate computer support systems aligned to each respective elemental design element in the second service network, each respective computer support system providing automated support for structured collaboration with other elemental design elements on the second service network.

14. The system of claim 13, wherein each respective computer support system is patterned after a template provided with a corresponding elemental design element on the generic CBM map.

15. The system of claim 14, wherein the second computer support system, comprised of separate computer support systems each patterned after a template on the generic CBM map, replaces a legacy process based system for providing the second business solution.

16. The system of claim 12, further comprising:
an automated computer support system for providing said means for configuring and means for assembling, said automated computer support system providing a display of the generic OEM map with a capability of selecting business components from the generic CBM map and with a capability of enabling configuration and assembly of the selected business components.

17. A computer implemented system for assembling business systems for an enterprise from re-usable business control elements, comprising:
first computer code stored on the computer and operable for partitioning the enterprise into non-overlapping components in a structural representation using the computer, said structural representation in a database on the computer being represented visually as a component map of a Component Business Model (CBM) of the enterprise, said partitioning taking assets of the enterprise and producing partitions (components) that are mutually exclusive and collectively complete, each said respective component including respective commercialization mechanisms for doing something commercially useful with said respective assets;
second computer code stored on the computer and operable for enabling identification by a user of one or more of said partitioned assets of the enterprise needed for a first business solution;
third computer code stored on the computer and operable for enabling identification by a user of one or more of said commercialization mechanisms on said component map needed to leverage the identified assets to provide the first business solution;
fourth computer code stored on the computer and operable for associating the identified assets and commercialization mechanisms with asset types and corresponding elemental control structures described on a generic said component business model (CBM) map of elemental design elements; and
fifth computer code stored on the computer and operable for enabling a user to configure the associated elemental control structures to leverage the respective corresponding asset types to provide the first business solution,
wherein an "elemental design element" is a component on said generic component business model (CBM) map defined by said assets at the lowest level of decomposition of the enterprise where the component has a single parent, and an "elemental control structure" is a control structure associated with an elemental design element.

18. The computer implemented system of claim 17, further comprising:
sixth computer code stored on the computer and operable for assembling the configured elemental design elements into a service network for providing the first business solution.

19. The computer implemented system of claim 18, further comprising:
seventh computer code stored on the computer and operable for enabling a user to identify a second business solution, and identify second assets and corresponding second commercialization mechanisms needed to leverage the second assets to provide the second business solution;
eighth computer code stored on the computer and operable for identifying at least one elemental design element from the first business solution, each elemental design element being comprised of an asset type and corresponding elemental control structure, as reusable for the second business solution;
ninth computer code stored on the computer and operable for enabling a user to associate the remaining second assets and second commercialization mechanisms with asset types and corresponding elemental control structures described on said generic CBM map of elemental design elements, and for producing a second list of the associated elemental design elements;
tenth computer code stored on the computer and operable for enabling a user to configure the at least one elemental design element identified from the first business solution and the remaining elemental design elements on said second list to provide the second business solution; and
eleventh computer code stored on the computer and operable for assembling the at least one elemental design element from the first business solution and the remaining elemental design elements on said second list into a second service network for providing the second business solution.

20. The method of claim 3, further comprising:
adding to the service network at least one additional elemental design element for enabling an enhancement to the first business solution.

* * * * *